(12) United States Patent
Samuel et al.

(10) Patent No.: US 12,737,195 B2
(45) Date of Patent: Sep. 15, 2026

(54) SYSTEM AND METHOD OF AUGMENTING PRESET SOFTWARE, FIRMWARE, AND HARDWARE CONFIGURATIONS SETTINGS BASED ON USER INPUT VIA ARTIFICIAL INTELLIGENCE PRODUCTIVITY TOOL

(71) Applicant: Dell Products LP, Round Rock, TX (US)

(72) Inventors: Balasingh Ponraj Samuel, Round Rock, TX (US); Daniel L. Hamlin, Round Rock, TX (US); Srikanth Kondapi, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 113 days.

(21) Appl. No.: 18/930,455

(22) Filed: Oct. 29, 2024

(65) Prior Publication Data

US 2026/0119197 A1 Apr. 30, 2026

(51) Int. Cl.
*G06F 9/00* (2018.01)
*G06F 9/24* (2006.01)
*G06F 9/445* (2018.01)
*G06F 15/177* (2006.01)

(52) U.S. Cl.
CPC ................................ *G06F 9/44505* (2013.01)

(58) Field of Classification Search
CPC .................................................. G06F 9/44505
See application file for complete search history.

(56) References Cited

U.S. PATENT DOCUMENTS 8,380,714 B2 2/2013 Inagaki
8,548,951 B2 10/2013 Solmer
9,201,957 B2 12/2015 Turdakov
9,218,412 B2 12/2015 Wang
9,626,358 B2 4/2017 Danielyan
9,633,085 B2 4/2017 Kamotsky
(Continued)

FOREIGN PATENT DOCUMENTS

WO 2020/192587 A1 10/2020
WO 2021/050382 A1 3/2021
WO 2023/249666 A1 12/2023

*Primary Examiner* — Mohammed H Rehman
(74) *Attorney, Agent, or Firm* — Prol Intellectual Property Law, PLLC; H. Kenneth Prol

(57) ABSTRACT

An information handling system operating an on-the-box artificial intelligence (AI) productivity tool comprising a hardware processor executing machine readable code instructions to receive an initial application capabilities list for AI productivity tool enableable software applications at a capabilities database and receive a general issued configuration policy with alternate settings from a management server dictating controlled operational modes of the information handling system. A mode configuration policy application module executing to update the capabilities at the capabilities database to comply with the general issued configuration policy for the controlled operational mode and any selected alternate settings to generate an updated application capabilities list and generate updated vectorized capability intent values for semantic matching to a vectorized query input intent value for a user query input to select and perform an updated capability responsive to the user query input in the controlled operational mode.

20 Claims, 5 Drawing Sheets

(56) References Cited

U.S. PATENT DOCUMENTS 9,648,683 B2 5/2017 Kangyo
10,146,593 B2 12/2018 Gong
10,776,847 B1 * 9/2020 Comar .............. G06Q 30/0625
11,620,262 B2 4/2023 Lee
11,842,738 B1 * 12/2023 Yan ........................ G06N 3/084
11,948,073 B2 4/2024 Zhang
12,373,425 B1 * 7/2025 Rai ....................... G06F 16/248
2018/0075131 A1 * 3/2018 Van Hoof ........... G06F 16/2471
2018/0365065 A1 12/2018 Guttman
2020/0387550 A1 12/2020 Cappetta
2020/0394360 A1 12/2020 Dunn
2021/0216576 A1 7/2021 Staub
2021/0256207 A1 8/2021 Dunn
2021/0334194 A1 10/2021 Xiao
2021/0366506 A1 11/2021 Han
2021/0374353 A1 12/2021 Zhang
2022/0035684 A1 2/2022 Gupte
2022/0035732 A1 2/2022 Xiao
2022/0092439 A1 3/2022 Liu
2022/0318502 A1 10/2022 Howell
2023/0105806 A1 4/2023 Dunn
2023/0222359 A1 7/2023 Panikkar
2023/0237263 A1 7/2023 Howell
2023/0251962 A1 8/2023 Xiao
2023/0267374 A1 8/2023 Polleri
2023/0336340 A1 10/2023 Polleri
2023/0394038 A1 * 12/2023 Shahrokh Esfahani ..................... G06N 3/045
2023/0409277 A1 12/2023 Sharifi
2024/0007414 A1 1/2024 Jain
2024/0037346 A1 2/2024 Chorakhalikar
2024/0054318 A1 2/2024 Feltin
2024/0061719 A1 2/2024 Reddy
2024/0069770 A1 2/2024 Prabhakar
2024/0069959 A1 2/2024 Prabhakar
2024/0070113 A1 2/2024 Prabhakar
2024/0161003 A1 5/2024 Alexander
2025/0077263 A1 * 3/2025 Karri ..................... G06F 40/211
2025/0245249 A1 * 7/2025 Thunuguntla ......... G06F 40/284

* cited by examiner

400

START

402 Execute machine readable code instructions of an artificial intelligence (AI) productivity tool enableable platform service tool operating to register initial list of firmware or hardware capabilities with an on the box (OTB) AI productivity tool operating at OS level 404 Execute machine readable code instructions of AI productivity tool enableable software application to register initial list of application capabilities with OTB AI productivity tool operating at OS level

C

406 Receive from information technology decision maker (ITDM) a generalized ITDM-issued configuration policy dictating one or more controlled configurations of hardware, firmware, or software applications, and identification of one or more augmented alternative settings for those controlled configurations 408 Execute machine readable code instructions of mode configuration policy application module for the OTB AI productivity tool to update initial list of firmware or hardware capabilities and initial list of application capabilities to include only capabilities in compliance with most recent generalized ITDM-issued configuration policy and augmented alternative settings 410 Execute machine readable code instructions of the capability intent value generator of the OTB AI productivity tool to generate vectorized capability intent values for the updated application capabilities and updated firmware or hardware capabilities

B

412 Universal User conversational interface software application , via an input device, receives user query input requesting action by the information handling system 414 Execute machine readable code instructions at the operating system level of an OTB AI productivity tool text embedding module to generate a vector query intent value for the received user query input

SYSTEM AND METHOD OF AUGMENTING PRESET SOFTWARE, FIRMWARE, AND HARDWARE CONFIGURATIONS SETTINGS BASED ON USER INPUT VIA ARTIFICIAL INTELLIGENCE PRODUCTIVITY TOOL

FIELD OF THE DISCLOSURE

The present disclosure generally relates to an on the box (OTB) artificial intelligence (AI) productivity tool that employs machine learning models stored at an information handling system for optimizing user productivity and information handling system performance with capability responses to user query inputs. The present disclosure more specifically relates to a hardware processor or embedded controller executing machine readable code instructions to execute an initial list of application, firmware or hardware capabilities for AI productivity tool enableable software applications, firmware or a hardware component that is in accordance with most recently received configuration policies as set by an information technology decision maker (ITDM) for execution the OTB AI productivity tool and update to customize configuration policies via user query inputs received.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more artificial intelligence (AI) productivity tool enableable software applications, chat bots, or the like. Further, the information handling system may include an on the box (OTB) artificial intelligence (AI) productivity tool employing machine learning models stored locally at the information handling system, as installed by a manufacturer of the information handling system, for optimizing user productivity and information handling system performance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
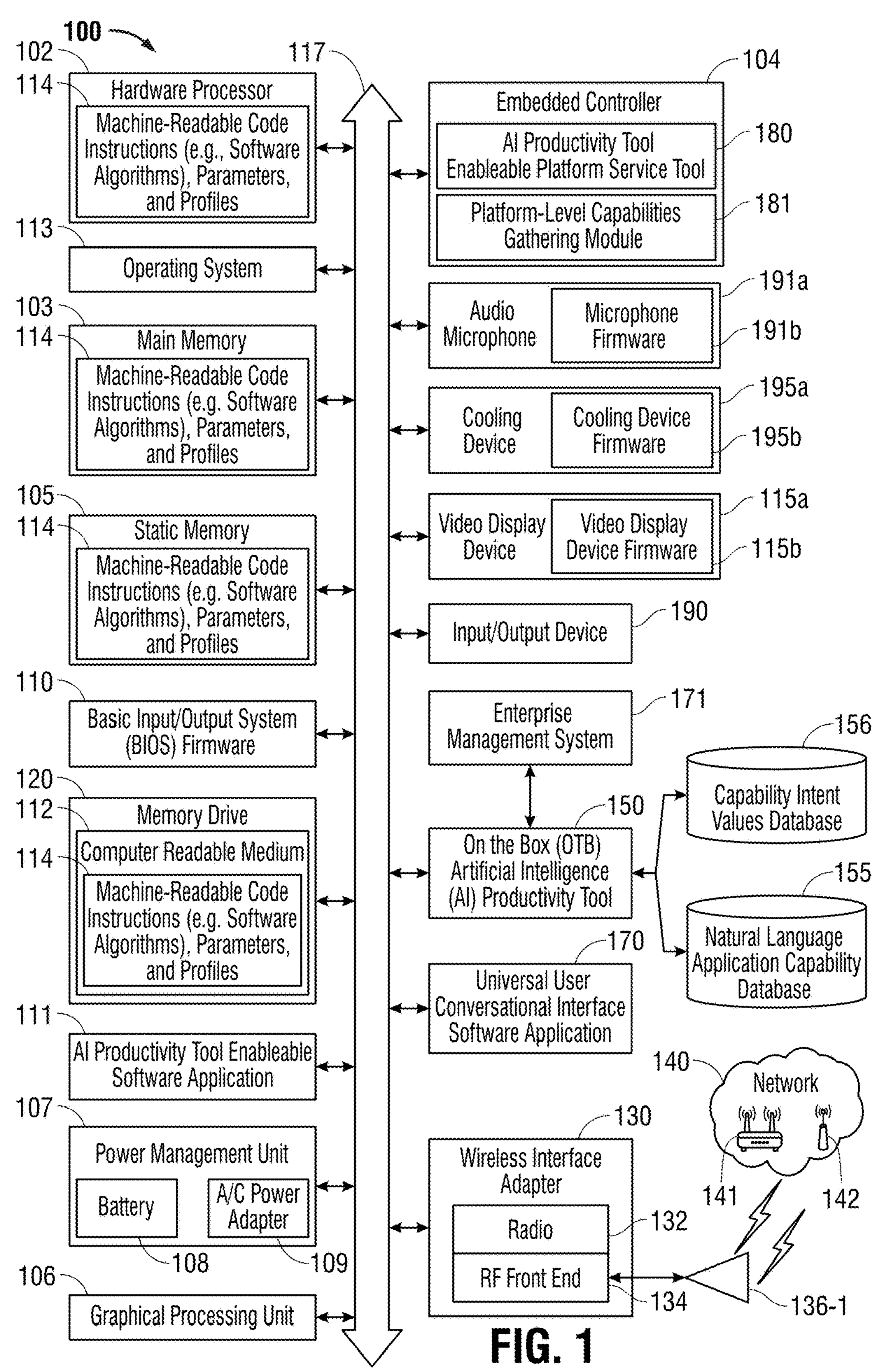
FIG. 1 is a block diagram illustrating an information handling system executing machine readable code instructions for an on the box (OTB) artificial intelligence (AI) productivity tool for discovery and accessibility of updating application, firmware or hardware capabilities for in compliance with a most recently received ITDM-set configurations policy or appended alternate settings according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and interactions with humans. An example of AI technologies includes, but is not limited to, chat-enabled environments (voice, text, etc.). These chat-enabled environments are described in embodiments herein as an on the box (OTB) AI productivity tool that receives this voice or text input from a user and implements a number of actions or utilizes services of various software applications based on the natural language of the input. In some information handling systems, the OTB AI productivity tool may interface with various AI productivity tool-enablable software applications being executed or executable on the information handling system at an operating system (OS) level. These AI productivity tool-enablable software applications may integrate with the OTB AI productivity tool to allow user queries to trigger certain responsive capability actions declared, supported, and managed by these AI productivity tool-enablable software applications. In embodiments herein, the OTB AI productivity tool executes at the operating system level and may work in tandem with an agent, referred to herein as an AI productivity tool enableable platform service tool, to allow user queries at the OS level OTB AI productivity tool to trigger certain firmware or hardware capability actions at the information handling system platform level declared and supported by firmware or hardware capabilities for various hardware components of the information handling system operating at the platform level below the OS of the information handling system.

A hardware processor executing code instructions of the OTB AI productivity tool in embodiments herein may receive user queries via an input/output device such as a keyboard, microphone, or video camera, described herein as user query inputs. The OTB AI productivity tool may match received user query inputs to known available capabilities published for various AI productivity tool enableable software applications and the OTB AI productivity tool via an available capabilities database. The natural language capabilities database and corresponding entries in a capability intent values database may include available application capabilities of AI productivity tool enableable software applications at the OS level as well as firmware or hardware capabilities for one or more hardware components executable at the platform level through execution by an embedded controller. The hardware processor executing code instructions of the OTB AI productivity tool may then direct execution of these application capabilities or firmware or hardware capabilities for hardware at the platform level based in similarity matching with a user query input received at the OTB AI productivity tool at the OS level. Execution of firmware or hardware capabilities for hardware at the platform level may be orchestrated through the AI productivity tool-enableable platform service tool executing at the embedded controller.

Prior to such a process and prior to a user providing such a user query input into an OTB AI productivity tool at the OS level, the embedded controller executing the AI productivity tool-enableable platform service tool may register with the OTB AI productivity tool an initial list of firmware or hardware capabilities achievable by the AI productivity tool-enableable platform service tool as well as one or more versions of firmware for hardware components at the platform level. The hardware processor executing various AI productivity tool enableable software applications may also register with the OTB AI productivity tool an initial list of application capabilities achievable by the various AI productivity tool enableable software applications. Such a registration of application capabilities or firmware or hardware capabilities at an OTB AI productivity tool may be required to take into account current configurations and policies of the various AI productivity tool enableable software applications, firmware, or those hardware components, as set by an information technology decision maker (ITDM) managing a plurality of information handling system within an enterprise system.

The ITDM for enterprises may issue a policy setting configurations for a plurality of information handling systems within the enterprise to control functionality of various AI productivity tool enableable software applications, firmware, or hardware components at individual information handling systems. In some cases, these policies may be adjustable or tunable by the user within parameters preset by the ITDM. For example, an ITDM-issued configurations policy may configure a plurality of information handling systems to operate in a quiet mode in which fan speed is automatically limited to a lower maximum value in order to decrease noise emission. However, such a configuration may cause processing speed to decrease as the temperature within the information handling system increases, due to the ITDM-issued configurations policy to limit or decrease fan speed to cool down the information handling system. Some users may wish to increase the fan speed in order to also increase the processor speed while the information handling system is in quiet mode. In order to accommodate user's wishes to tweak or tune these policy settings, an ITDM in embodiments herein may transmit alternate settings for a given policy (e.g., set the information handling system to quiet mode) that a user may choose to tailor the policy to the user's preferences, such as a range of fan speeds that may be used in compliance with the quiet mode, to augment the policy-mandated maximum fan speed and, perhaps, adjust other quiet mode settings. This is only one example of an ITDM-issued configuration policy for various modes of operation, and others may include configurations policies relating to power consumption, battery conservation, security, data storage, or other system operation optimization methods or modes. In each of these cases, when instituting a generalized ITDM-issued configuration policy across a plurality of information handling systems within an enterprise, the ITDM may also append a list of alternate settings defined as in compliance with such a generalized configuration policy that a user may choose in order to personalize the configuration policy according to user preferences. Adjustment of selectable augmented settings or to optional settings of the ITDM-issued configurations policy via user query inputs to the OTB AI productivity tool may be used to adjust or reset the ITDM-issued configurations policy and appended augmented settings for customization of various modes for particular client information handling systems for later applications as well.

Such ITDM-issued configurations policies may disallow or make perfunctory portions of the pre-registered initial list of application capabilities for the various AI productivity tool enableable software applications or the firmware or hardware capabilities. For example, an AI productivity tool enableable software application, firmware or hardware capability for adjusting fan speed for the information handling system may be registered with the OTB AI productivity tool, but the current generalized ITDM-issued configuration policy with augmented alternate settings from an ITDM-issued configurations policy may apply limitations to performing that registered AI productivity tool enableable software application, firmware or hardware capability, or the available settings for that capability may be narrower than those available in the initial capabilities list. More specifically, the initial application capabilities list or the initial firmware or hardware capabilities list may allow for setting the fan speed to higher maximum, while the current generalized ITDM-issued configuration policy or augmented alternate settings for a quiet mode policy only allow setting the fan speed to lower maximum speeds when a quiet mode ITDM-set configurations policy or appended alternate settings are issued. Thus, each time the ITDM institutes a new generalized ITDM-issued configuration policy with augmented alternate settings, the actual list of application capabilities and firmware or hardware capabilities performable may change or be limited. This may change depending on the ITDM-issued configurations policy or appended alternate settings issued for different operational modes. Such issued ITDM-issued configurations policy or appended alternate settings may need to be reflected at the list of registered application capabilities or firmware or hardware capabilities registered at the OTB AI productivity tool at the OS level instructing execution of such application capabilities or firmware or hardware capabilities in response to a user query input. Some portions of limitations or settings of the issued ITDM-issued configurations policy or appended alternate settings for particular operational modes may be optional or may be augmented by available setting adjustments provided to a user. Embodiments of the present disclosure include receipt user query inputs at the OTB AI productivity tool adjusting particular setting or requesting particular capability intent actions being used to automatically adjusting optional or adjustable portions for the ITDM-issued configurations policy or appended alternate settings to customize those ITDM-issued configurations policy or appended alternate settings applied for operations modes during later operations.

A hardware processor for an information handling system executing machine readable code instructions for the OTB AI productivity tool in embodiments herein may apply ITDM-issued configurations policy or appended alternate settings by only instructing performance of application capabilities or firmware or hardware capabilities that are registered in accordance with current generalized ITDM-issued configuration policy with augmented alternate settings. These firmware or hardware capabilities (also called capability intents and having capability intent values) may describe those functionalities of each of one or more AI productivity tool enablable software applications, or versions of firmware for one or more hardware components that may be executed when interfacing with the OTB AI productivity tool. Natural language descriptions of the firmware or hardware capabilities and any software capabilities of AI productivity tool-enableable software applications may be stored within a natural language capability database for comparison to received user query inputs, for example, in order to identify a application, firmware or hardware capability most likely to address a user's request within the received user query inputs.

As described below, some application capabilities or firmware or hardware capabilities for hardware, including firmware drivers for the hardware components, are accessible as registered capabilities as part of the OTB AI productivity tool executing at the OS level, but execution of the application capabilities or firmware or hardware capabilities may or may not be in compliance with current generalized ITDM-issued configurations policy or appended alternate settings. Further, these generalized configuration policies may be routinely adjusted by a user in compliance with the augmented alternate settings accompanying these generalized configuration policies such as for augmented or optional portions of the ITDM-issued configurations policy or appended alternate settings or augmented settings included. A system is needed to routinely update the stored registered list of application capabilities and firmware or hardware capabilities at the OTB AI productivity tool and executable by the various AI productivity tool enableable software applications, firmware and hardware components of an information handling system as the generalized configuration policies are updated, or new augmented alternate settings for those generalized configuration policies are issued by an ITDM.

A hardware processor executing machine readable code instructions for an OTB AI productivity tool in embodiments herein may address this issue by updating limitations or settings of the initial list of firmware or hardware capabilities and initial list of application capabilities stored at a natural language capabilities database to include only capabilities in compliance with most recently received generalized ITDM-issued configuration policies and augmented alternate settings for particular operational modes for client information handling systems. For example, the hardware processor in embodiments may execute machine readable code instructions for the OTB AI productivity tool to receive a generalized ITDM-issued configurations policy with an appended list of augmented alternate settings and apply those limitations or settings from the generalized ITDM-issued configurations policy with an appended list of augmented alternate settings to the registered application capabilities. Additionally, the capability intent values for those application capability descriptions or firmware or hardware capability descriptions for the firmware or hardware capabilities that are not in compliance with the generalized ITDM-issued configurations policy or the alternate settings allowable by the ITDM are also omitted from the registered application capabilities or firmware or hardware capabilities at the OTB AI productivity tool. In this way, the hardware processor executing machine readable code instructions for the OTB AI productivity tool may ensure that any commands to execute functionality of the registered AI productivity tool enableable software application capabilities, or firmware or hardware capabilities by selection of a registered application capability, or firmware or hardware capability at the OS level are in accordance with most recent generalized IDTM-issued configuration policies and alternate settings for those configuration policies, as allowed by an ITDM in embodiments herein.

In some embodiments, however, the user may choose to tune optional or augmented portions of the ITDM-issued configuration policy by adjusting settings from the appended list of alternate settings within limits preset by the ITDM. In such a scenario, the hardware processor executing machine readable code instructions for the OTB AI productivity tool may receive those setting adjustments and then apply those adjustments to limitations or settings to register an updated list of application capabilities and an updated list of firmware or hardware capabilities having updated limitations or updated settings to the initially registered application capabilities or initially registered firmware or hardware capabilities. The user may tune optional or augmented portions of the ITDM-issued configuration policy via user query inputs to the OTB AI productivity tool.

A hardware processor executing machine readable code instructions for a capability intent value generator embedding process of the OTB AI productivity tool may determine capability intent values associated with the natural language descriptions of the updated application capabilities list or updated firmware or hardware capabilities list adjusted based on receipt of generalized ITDM-issued configuration policy with augmented alternate settings at the OTB AI productivity tool, as well as any user adjusted updates to those, for inclusion in the capability intent values database. These capability intent values are a mathematical representation, such as a vectorized capability intent value in a multi-axis vector space, of capability operations or services of software capabilities of AI productivity tool enableable software applications at the OS level as well as firmware or hardware capabilities at the platform level in embodiments herein. Such capability intent values as vectors are used in a natural language processing method of execution of a large language model (LLM) for an OTB AI productivity tool to determine and correlate the user's query intent or requested action within a user query input that takes into account the context or semantics of the words used within the user query input with one of a plurality of software capabilities of AI productivity tool enableable software applications or firmware or hardware capabilities at the platform level.

Upon receipt of a user query input by the OTB AI productivity tool in embodiments herein, a hardware processor executes code instructions to determine a vectorized query input intent value for the user query input that is compared to the capability intent values. The hardware processor executing machine readable code instructions for a query intent to capability determination module in embodiments herein may then perform one or more similarity search methods to match the query input intent value with an application, firmware or hardware capability intent value in order to identify a responsive capability to address the user request within the user query input. The hardware processor executing code instructions for the OTB AI productivity tool may then instruct execution of the matching capability, via the AI productivity tool-enableable platform service tool, which may now be selected from an updated application capabilities or firmware or hardware capabilities list available for matching in such a way that are updated and tailored to only reflect most recently received generalized ITDM-issued configuration policies and augmented alternate settings available to users and customized with adjustments within limits set by the ITDM.

Turning now to the figures, FIG. 1 illustrates an information handling system 100 similar to the information handling systems according to several aspects of the present disclosure. As described herein, an on the box (OTB) artificial intelligence (AI) productivity tool 150 in an embodiment may execute at the operating system 113 level of an information handling system 100. The OTB AI productivity tool 150 may work in tandem with an agent, referred to herein as an AI productivity tool-enableable platform service tool 180, to allow user queries to trigger certain firmware or hardware capabilities for firmware for hardware components at a platform level. Examples of firmware may include microphone firmware 191*b* or cooling device firmware 195*b*, or firmware for hardware input/output devices 190 (e.g., input/output device 190, power management unit 107, display device 115*a*, microphone 191*a*, or cooling device 195*a*). The firmware or hardware capability actions at an information handling system platform level are declared and supported by firmware (e.g., 191*b* or 195*b*) for various hardware components (e.g., 191*a* or 195*a*, respectively) of the information handling system 100 for the AI productivity tool-enableable platform service tool 180 operating at the platform level of the information handling system 100. The platform level of the information handling system 100 includes operations and executions of an embedded controller or other controller hardware operating below the OS 113 of the information handling system.

A hardware processor 102 executing code instructions of the OTB AI productivity tool 150 in an embodiment may receive user query inputs via an input/output device 190 such as a keyboard, microphone, or video camera, described herein as user query inputs. The OTB AI productivity tool 150 may match received user query inputs to known available software capabilities of an AI productivity tool-enableable software applications 111 at the OS 113 level or available firmware or hardware capabilities of the AI productivity tool-enableable platform service tool 180 at a platform level. Firmware or hardware capabilities may relate to platform level functions affecting one or more versions of firmware (e.g., 191*b* or 195*b*) for one or more hardware components (e.g., 191*a* or 195*a*) executable at the platform level through execution by an embedded controller 104. The hardware processor 102 executing code instructions of the OTB AI productivity tool 150 may then direct execution of these software capabilities at the OS 113 level or firmware or hardware capabilities at the platform level via the AI productivity tool-enableable platform service tool 180 in response to a received user query input.

The hardware processor 102 executing machine readable code instructions for the OTB AI productivity tool 150 in an embodiment may only instruct performance of registered firmware or hardware capabilities at the OS 113 level via the AI productivity tool-enableable platform service tool 180 that are in accordance with current generalized ITDM-issued configuration policies or alternate settings dictated by an information technology decision maker (ITDM) of an enterprise for the one or more versions of firmware (e.g., 191*b* or 195*b*), or for the one or more hardware components (e.g., 191*a* or 195*a*). To do so, registered application capabilities or firmware or hardware capabilities at the OTB AI productivity tool 150 in the OS 113 level may need to be updated in accordance with these generalized configuration policies and alternate settings of the one or more versions of firmware (e.g., 191*b* or 195*b*) for the one or more hardware components (e.g., 191*a* or 195*a*). These firmware or hardware capabilities may describe those functionalities of each of one or more versions of firmware (e.g., 191*b* or 195*b*) for one or more hardware components (e.g., 191*a* or 195*a*) that may be orchestrated via the AI productivity tool-enableable platform service tool 180 interfacing with the OTB AI productivity tool 150.

Both firmware or hardware capabilities as well as software capabilities of one or more AI productivity tool-enableable software applications 111 executable at the information handling system may be available capabilities registered for access by the OTB AI productivity tool 150 in embodiments herein. These AI productivity tool-enableable software application capabilities and firmware or hardware capabilities may include natural language descriptions of the registered available capabilities that may be stored within a natural language capability database 155 in some embodiments for comparison to received user query inputs, for example, in order to identify a capability most likely to address a user's request within the received user query inputs. Further, registered available capabilities, from software, firmware, or hardware, may have embedded capability intent values stored in a capability intent values database 156 for comparison to embedded query intent values of the received user query inputs, for example, in order to identify a responsive capability most likely to address a user's request within the received user query inputs in embodiments herein.

As described below, one or more registered capabilities, for AI productivity tool-enableable software applications 111 or for firmware or hardware such as firmware drivers for the hardware components, are accessible as part of the OTB AI productivity tool 150 executing at the OS 113 level. The AI productivity tool-enableable platform service tool 180 for firmware managed and executed at the information handling system platform level may link the OTB AI productivity tool 150 to platform level execution of capabilities for firmware or hardware in some embodiments. Further, these registered capabilities may be routinely updated or adjusted by institution by an ITDM of a generalized ITDM-issued configurations policy adjusting available functionality for the AI productivity tool enableable software applications 111, firmware, or hardware. Moreover, a user may tune these ITDM-issued configurations policies according to alternate settings or selection of optional configurations via adjustments made available in compliance with the generalized ITDM-issued configurations policy by the ITDM of an enterprise management system 171 for the information handling system 100. By tailoring the registered list of capabilities, for software, firmware, or hardware, in the natural language capabilities database 155 as well as associated application capability intent values at the capabilities intent values database 156, the hardware processor 102 executing machine readable code instructions for the OTB AI productivity tool 150 ensures the registered capabilities for the OTB AI productivity tool 150 are in accordance with most recently received and instated generalized ITDM-issued configuration policies and appended augmented alternate settings. These most recently received and instated generalized ITDM-issued configuration policies and appended augmented alternate settings may be tuned by the user via user query inputs in optional or augmented portions for application of customized limitations or setting to the available capabilities from one or more versions of AI productivity tool enableable software application 111, firmware (e.g., 191*b* or 195*b*) or one or more hardware components (e.g., 191*a* or 195*a*) operating on the information handling system 100.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, other hardware controllers, or any combination thereof. Additional components of the information handling system 100 may include one or more storage devices such as static memory 105 or drive unit 120. The information handling system 100 may include or interface with one or more communications ports for communicating with external devices, as well as an input/output (IO) device 190, a video/graphics display device 115*a*, an audio microphone 191*a* for recording user communications, or any combination thereof. Portions of an information handling system 100 may themselves be considered information handling systems 100.

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate on a plurality of information handling systems 100. In a specific embodiment, machine readable code instructions for the OTB AI productivity tool 150, a universal user conversational interface software application software application 170, an AI productivity tool-enableable platform service tool 180, a platform level capabilities gathering module 181, one or more AI productivity tool enableable software applications 111, and firmware (e.g., 191*b* and 195*b*) may execute locally at the information handling system 100, or on the box.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 120 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, EC 104, GPU 106, or any other hardware processing device. The information handling system 100 may also include one or more buses 117 operable to transmit communications between the various hardware components such as any combination of various I/O devices 190, 191*a*, 193*a*, as well as between hardware processors 102, an EC 104, GPU 106 or other, the operating system (OS) 113, the basic input/output system (BIOS) 110, the wireless interface adapter 130, or a radio module 132, among other components described herein. In an embodiment, the hardware processor 102, EC 104, and/or GPU 106 may execute one or more bus drivers in order to transmit this data between the information handling system 100 and the input/output devices 190 described herein. As described herein, the information handling system 100 further includes a video/graphics display device 115*a*. The video/graphics display device 115*a* in an embodiment may function as a liquid crystal display (LCD), an organic light emitting diode (OLED), a flat panel display, or a solid-state display. It is appreciated that the video/graphics display device 115*a* may be wired or wireless and may be an external video/graphics display device 115*a* that allows a user to increase the desktop area by extending the desktop in an embodiment.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, EC 104 or any other hardware processing resource and may include software agents, or other aspects or components used to execute the methods and systems described herein. Various software modules comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 120 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 120 during execution by the hardware processor 102, EC 104, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 120 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 120, the hardware processor 102 (e.g., CPU), the EC 104, the GPU 106, a video/graphic display device 115*a*, or other wired I/O devices 191*a*, 195*a*, or 190 and other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
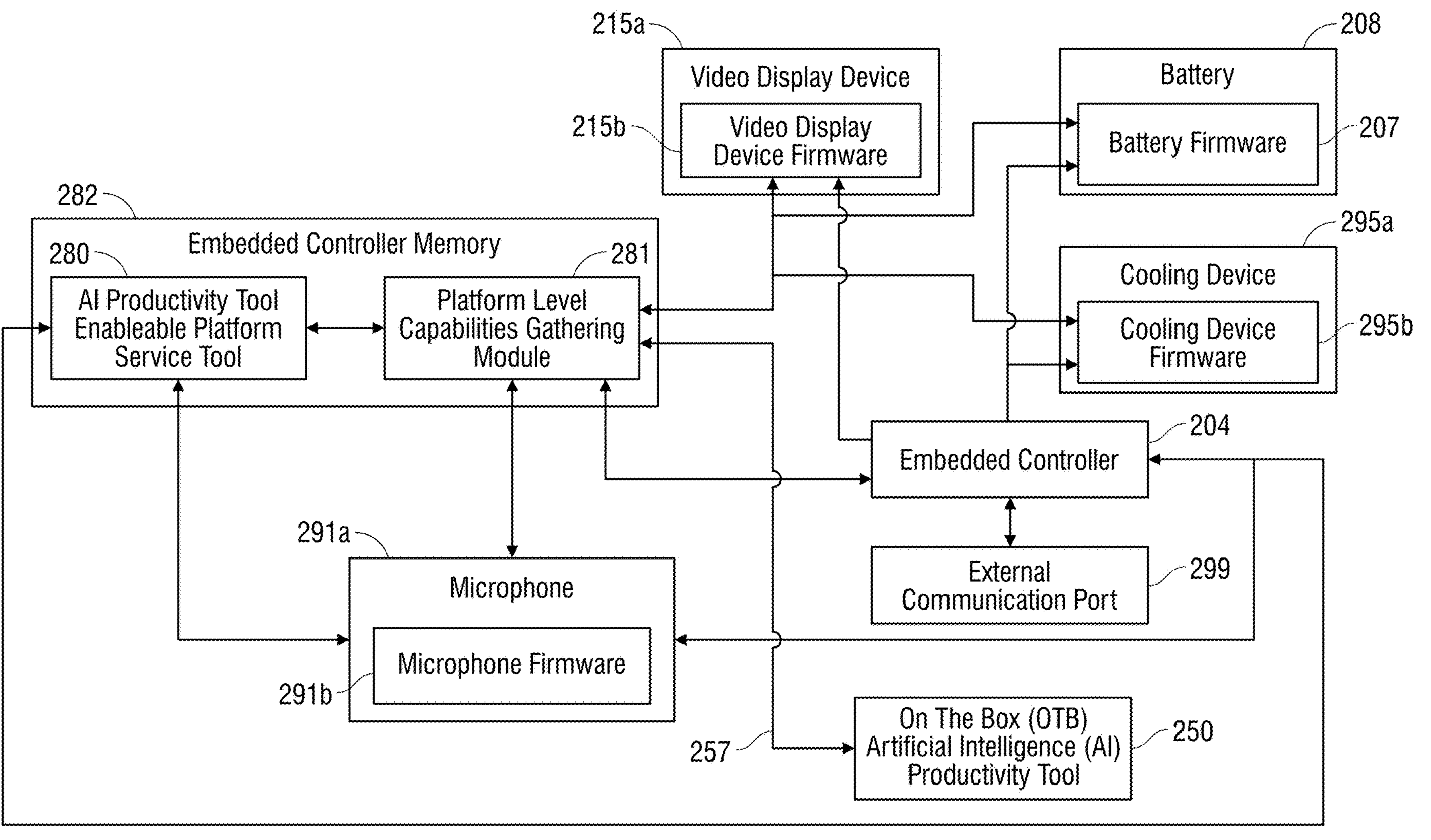
FIG. 2 is a block diagram illustrating an embedded controller executing machine readable code instructions for an AI productivity tool-enableable platform tool to allow user queries to trigger certain firmware or hardware capability actions for hardware components or firmware at a platform level according to an embodiment of the present disclosure.

FIG. 2 is a block diagram illustrating an embedded controller executing machine readable code instructions for a platform-level AI productivity tool-enableable platform tool to allow user queries to trigger certain firmware or hardware capability actions for hardware components or firmware at an information handling system platform level according to an embodiment of the present disclosure. As described herein, machine readable code instructions for the OTB AI productivity tool 250 in an embodiment may execute at an operating system level of an information handling system and may work in tandem with an AI productivity tool-enableable platform service tool 280 executing at the platform level to allow user queries to trigger certain firmware or hardware capability actions for hardware components or firmware at an information handling system platform level. These firmware or hardware capability actions are declared and supported by firmware, such as battery firmware 207, microphone firmware 291*b*, cooling device firmware 295*b* or other firmware for various hardware components, such as battery 208, microphone 291*a*, cooling device 295*a* or other components of the information handling system. Coordination of these firmware or hardware capability actions may be by the AI productivity tool-enableable platform service tool 280 operating at the platform level, below the OS of the information handling system, for interface with the OTB AI productivity tool 250 at the OS level. These are only a few examples of hardware components and firmware managed by the AI productivity tool-enableable platform service tool 280 and the OTB AI productivity tool 250. For example, a battery 208 may also involve controls by a PMU (e.g., 107 in FIG. 1) with a PMU controller executing PMU firmware (not shown) in an example embodiment. It is contemplated that any type of internal or external hardware components, peripheral device, or firmware therefor that is in communication with the AI productivity tool-enableable platform service tool 280, or the platform level capabilities gathering module 281, may be controlled thereby in response to received user query inputs as described in various embodiments herein.

A hardware processor executing code instructions of the OTB AI productivity tool 250 in an embodiment herein may receive user query inputs via an input/output device such as a microphone 291*a*, as described in greater detail below with respect to FIG. 3. The OTB AI productivity tool 250 may match received user query inputs to known, available capabilities from a natural language capability database or capability intent values database at the OS level. This may include registered firmware or hardware capabilities at natural language capability database or capability intent values database of the AI productivity tool-enableable platform service tool 280 for firmware or hardware capability actions controlling one or more versions of firmware (e.g., 207, 291*b*, or 295*b*), or one or more hardware components (e.g., 208, 291*a*, or 295*a*) executable at the platform level. The hardware processor executing code instructions of the OTB AI Productivity tool 250 may then direct execution of these firmware or hardware capability actions at the platform level, below the OS level, via communication to and coordination by an embedded controller 204 executing the AI productivity tool-enableable platform service tool 280 in embodiments herein.

Prior to such a process and prior to a user providing such a user query input into an OTB AI productivity tool 250, the AI productivity tool-enableable platform service tool 280 may register with the OTB AI productivity tool 250 an initial list of firmware or hardware capabilities achievable by each of the one or more versions of firmware (e.g., 207, 291*b*, 295*b*), or one or more hardware components (e.g., 208, 291*a*, 295*a*). For example, the firmware or hardware capabilities registered and stored at the OTB AI productivity tool 250 may describe functionalities of battery firmware 207 for the battery 208 or a PMU controller executing firmware controlling battery 208 via the PMU and may include various power mode settings including a power saving mode. In another example, the firmware or hardware capabilities registered and stored at the OTB AI productivity tool 250 may describe functionalities of the cooling device firmware 295*b* executed by a thermal controller to adjust settings for the cooling device 295*a* according to a user selectable thermal table (USTT), such as by increasing or decreasing fan speed. In still another example, the firmware or hardware capabilities registered and stored at the OTB AI productivity tool 250 may describe functionalities of the display device 215*a* according to policies instituted via display device firmware 215*b*, such as application of a privacy screen setting that coordinates pixels within the display device 215*a* to only emit light such that a user sitting directly in front of the display device can read the contents of displayed information. In yet another example, the firmware or hardware capabilities registered and stored at the OTB AI productivity tool 250 may describe functionalities of the external communications port 299 which may be operatively connected to one or more external or peripheral devices.

These initial firmware or hardware capabilities registered with the OTB AI productivity tool in an embodiment may include any functionality allowed or supported by the firmware or hardware component described within these initial firmware or hardware capabilities. For example, the initial firmware or hardware capabilities list for the cooling device 295*a* may include the full range of fan speeds achievable by the cooling device 295*a* itself, as set according to the manufacturer of the cooling device 295*a*. As another example, the initial firmware or hardware capabilities list for the display device 215*a* may include the full range of viewing angles achievable by the display device 215*a*, as set according to the manufacturer of the display device 215*a*. As yet another example, the initial firmware or hardware capabilities list for the battery 208 may include the full range of battery power consumption rates allowable by the manufacturer of the battery 208. In still another example, the initial firmware or hardware capabilities list for the external communications port 299 may include full input and output access between an external device and the information handling system, as operatively coupled via the external communication port 299. Such a registration of initial firmware or hardware capabilities at the platform level capabilities gathering module 281 may not take into account current configurations and policies of the various firmware (e.g., 207, 215*b*, 295*b*), or those hardware components (e.g., 208, 215*a*, 295*a*, 299), as set by an information technology decision maker (ITDM) managing a plurality of information handling systems within an enterprise system.

The ITDM for enterprises may issue a policy setting configurations for a plurality of information handling systems within the enterprise to control functionality of various AI productivity tool enableable software applications, firmware (e.g., 207, 215*b*, 295), or hardware components (e.g., 208, 215*a*, 295*a*, 299) at individual information handling systems. Those generalized ITDM-issued configuration policies and appended augmented alternate settings may relate to one or more configuration modes to be implemented. Example configuration modes may include a secure mode, focus mode, efficiency mode, quiet mode, turbo mode, or others each of which may have generalized ITDM-issued configuration policies and appended augmented alternate settings. In some cases, these generalized ITDM-issued configuration policies and appended augmented alternate settings may be adjustable or tunable by the user within parameters preset by the ITDM. For example, a generalized ITDM-issued configuration policy with appended augmented alternate settings may configure a plurality of information handling systems to operate in a quiet mode in which a maximum fan speed for the cooling device 295*a* is automatically lowered in order to decrease noise emission. However, such a configuration may cause processing speed to decrease as the temperature within the information handling system increases, due to the ITDM-set decrease in fan speed to cool down the information handling system. Some users may wish to increase the fan speed for cooling device 295*a* in order to also increase the hardware processor (e.g., 102 of FIG. 1) speed while the information handling system is set in a quiet mode. Alternatively, some users may wish to lower the fan speed even further than the lowered maximum fan speed value dictated by the quiet mode ITDM-issued configurations policy, to further decrease noise levels. In order to accommodate the user's wishes to tweak or tune these policy settings, an ITDM in embodiments herein may transmit alternate settings for a given policy (e.g., set the information handling system to quiet mode) that a user may choose to tailor the policy to augment certain settings to the user's preferences, such as a range of fan speeds for the cooling device 295*a* that may be used in compliance with the quiet mode, to augment the policy-mandated lowered fan speed. This is only one example of a generalized ITDM-issued configuration policy with appended augmented alternate settings, and others may include policies relating to power consumption, battery conservation, security, data storage, or other system operation optimization methods or modes.

In another example embodiment, a generalized ITDM-issued configuration policy with appended augmented alternate settings may configure a plurality of information handling systems to operate in a power savings mode in which various background applications or services are automatically set to draw a minimum amount of battery 208 power when the information handling system is disconnected from A/C power. However, such a configuration may slow down or deactivate a process the user is using or wishes to remain fully active during operation even without A/C power. In order to accommodate the user's wishes to tweak or tune these policy settings, an ITDM in embodiments herein may transmit alternate settings for a given generalized ITDM-issued configuration policy with appended augmented alternate settings (e.g., set the information handling system to power savings mode) that a user may choose to tailor the policy to augment particular settings to the user's preferences. For example, augmented alternate settings may include identifying one or more background applications or services that should be excluded from any power draw limitations shutting down background applications and that still may be used in compliance with the power savings mode to augment the policy-mandated power draw limitations.

In still another example embodiment, a generalized ITDM-issued configuration policy with appended augmented alternate settings may configure a plurality of information handling systems to operate in a privacy screen mode in which the viewing angle for the display device 215*a* is decreased to disallow viewing of the screen by others nearby the information handling system who are not authorized to view the displayed content. This may be one of several security measures for a secure mode included within a single generalized ITDM-issued configuration policy with appended augmented alternate settings or may form its own standalone configurations policy. Some users may dislike this privacy screen mode and wish to increase the allowed viewing angle without affecting other security settings within the secure mode ITDM-issued configurations policy. In order to accommodate the user's wishes to tweak or tune these policy settings, an ITDM in embodiments herein may transmit alternate settings for a given a generalized ITDM-issued configuration policy with appended augmented alternate settings (e.g., enabling privacy screen mode as part of a larger security-driven configurations policy) that a user may choose to tailor the policy by augmenting a setting, such as a privacy screen setting, to the user's preferences, such as increasing the viewing angle allowable by the privacy screen mode, to augment the policy-mandated security measures.

In yet another example embodiment, a generalized ITDM-issued configuration policy with appended augmented alternate settings may configure a plurality of information handling systems to operate in a secure mode in which read or write operations to and from external devices via an external communications port 299 are limited, encrypted, or disabled. This may be one of several security measures of secure mode included within a single ITDM-issued configurations policy or may form its own standalone configurations policy. Some users may wish to temporarily or permanently allow for otherwise policy-restricted read write operations via the external communications port 299, such as enabling read only or write only operations instead of disabling the external communications port 299, enabling encrypted read or write operations instead of disabling the external communications port 299 or restricting read or write operations fully, or removing all encryption, read or write limitations for a trusted device. In order to accommodate the user's wishes to tweak or tune these policy settings, an ITDM in embodiments herein may transmit alternate settings for a given a generalized ITDM-issued configuration policy with appended augmented alternate settings (e.g., restricting access to the information handling system via the external communications port 299) that a user may choose to tailor the policy and augment such a setting to the user's preferences, such as enabling read only or write only operations instead of disabling the external communications port 299, enabling encrypted read or write operations instead of disabling the external communications port 299 or restricting read or write operations fully, or removing all encryption, read or write limitations for a trusted device.

In yet another example embodiment, a generalized ITDM-issued configuration policy with appended augmented alternate settings may configure a plurality of information handling systems to operate in a secure mode in which only encrypted versions of firmware (e.g., 291*b*, 295*b*, 215*b*, 207) may be downloaded and installed on the information handling system. This may be one of several security measures of the secure mode included within a single ITDM-issued configurations policy or may form its own standalone configurations policy. Some users may wish to temporarily or permanently allow for downloading and installation of an unencrypted version of firmware (e.g., 291*b*, 295*b*, 215*b*, 207). In order to accommodate the user's wishes to tweak or tune these policy settings, an ITDM in embodiments herein may transmit alternate settings for a given generalized ITDM-issued configuration policy with appended augmented alternate settings (e.g., requiring encryption of firmware) that a user may choose to tailor the policy to augment particular settings to the user's preferences, such as allowing for temporary or permanent download and installation of unencrypted versions of firmware (e.g., 291*b*, 295*b*, 215*b*, 207).

Such ITDM-set configurations policies may disallow, limit or otherwise adjust the pre-registered initial list of application capabilities for the various firmware or hardware capabilities. For example, firmware or hardware capabilities for adjusting fan speed at the cooling device 295*a* for the information handling system may be registered with the OTB AI productivity tool 250 via the platform level capabilities gathering module 281, but the current a generalized ITDM-issued configuration policy with appended augmented alternate settings appended thereto may limit performance of that registered firmware or hardware capability, or the available settings for that capability may be narrower than those available in the initial capabilities list. More specifically, the initial firmware or hardware capabilities list may allow for setting the fan speed of the cooling device 295*a* to maximum fan capacity, while the current generalized ITDM-issued configuration policy with appended augmented alternate settings only allow setting the fan speed of the cooling device 295*a* to lower maximum speeds, below the maximum fan capacity for the fan hardware. Thus, each time the ITDM institutes a new generalized ITDM-issued configuration policy with appended augmented alternate settings, the actual list of firmware or hardware capabilities performable in accordance with the configurations policy and augmented alternate settings may change by removal of capabilities or have limitations or other adjustments applied. However, this still needs to be reflected by the list of registered firmware or hardware capabilities registered at the OTB AI productivity tool 250 via the platform level capabilities gathering module 281 for instructing execution of such firmware or hardware capabilities in response to a user query input.

As described in greater detail below with respect to FIG. 3, a hardware processor for an information handling system executing machine readable code instructions for the OTB AI productivity tool 250 in an embodiment may address these issues by only instructing performance of firmware or hardware capabilities that are registered in accordance with current generalized ITDM-issued configuration policy with augmented alternate settings. Upon receipt of such a generalized ITDM-issued configuration policy with augmented alternate settings, or updates thereto provided via user query input or user adjustments, as described in embodiments herein, the OTB AI productivity tool 250 in an embodiment may update the initial list of firmware or hardware capabilities stored at a natural language capabilities database to include only capabilities in compliance with most recently received generalized ITDM-issued configuration policy with augmented alternate settings, as issued by the ITDM or automatically updated through customization to the extent permitted by the ITDM by the systems and methods herein.

For example, the hardware processor in embodiments may execute machine readable code instructions for the OTB AI productivity tool 250 to receive a generalized ITDM-issued configuration policy with augmented alternate settings for implementation to amend, limit, or alter the registered capabilities accessible by the OTB AI productivity tool 250. The user may choose to tune the ITDM-issued configuration policy with augmented alternate settings within limits preset by the ITDM, such as wanting certain optional or augmentable settings to be removed or changed in the ITDM-issued configurations policy. In such a scenario, the hardware processor executing machine readable code instructions for the OTB AI productivity tool 250 may then determine an updated list of capabilities for the generalized ITDM-issued configuration policy with augmented alternate settings as well as for any permitted changes to tune the same made by the user. In doing so, the hardware processor executing machine readable code instructions for the OTB AI productivity tool 250 registers an updated list of firmware or hardware capabilities to alter or remove initially registered firmware or hardware capabilities that are not in compliance with the most recently received generalized ITDM-issued configuration policy with augmented alternate settings in an embodiment. Additionally, new capability intent values for those firmware or hardware capability descriptions for the firmware or hardware capabilities that are altered to be in compliance with the generalized ITDM-issued configuration policy with augmented alternate settings including any tuning changes made by a user and allowable by the ITDM are generated for the updated registered firmware or hardware capabilities at the OTB AI productivity tool 250. Further, capability intent values for those firmware or hardware capability descriptions for the firmware or hardware capabilities that are removed in compliance with the generalized ITDM-issued configuration policy with augmented alternate settings are omitted from the registered firmware or hardware capabilities at the OTB AI productivity tool 250.

The OTB AI productivity tool 250, via the AI productivity tool-enableable platform service tool 280 in an example embodiment, may access an initial registered capabilities list of firmware or hardware capabilities that includes allowing for the full range of battery power consumption rates allowable by the manufacturer of the battery 208. The OTB AI productivity tool 250 in an embodiment may receive a generalized ITDM-issued configuration policy with augmented alternate settings that place information handling system in a power savings mode to conserve the battery 208 under certain circumstances. One policy of the generalized ITDM-issued configuration policy with augmented alternate settings for the power savings mode identifies one or more background applications or services that should be excluded from any power draw limitations and allowed to execute while still in compliance with the power savings mode. In such a scenario, the OTB AI productivity tool 250 in an embodiment may adjust or remove any battery power consumption rates allowable by the manufacturer of the battery 208 (e.g., no limitations on battery power consumption for background applications or services) in the initial list of capabilities such that an updated list of capabilities related to battery power consumption rates comply with the received generalized ITDM-issued configuration policy with augmented alternate settings. These may be further updated with tuning by the user of optional settings or augmented alternate settings, such as via user query input or other input changing a specific setting of the ITDM-issued configuration policy with augmented alternate settings.

As another example, the AI productivity tool 250, via the AI productivity tool-enableable platform service tool 280 in an example embodiment, may access an initial registered capabilities list of firmware or hardware capabilities that allows for use of the full range of fan speeds achievable by the cooling device 295*a* itself, as set according to the manufacturer of the cooling device 295*a*. The OTB AI productivity tool 250 in an embodiment may receive an ITDM-issued configuration policy with augmented alternate settings that place the cooling device 295*a* in a quiet mode in which a maximum fan speed allowed for the cooling device 295*a* is automatically lowered in order to decrease noise emission, but also allow the user to choose from a range of lowered maximum fan speeds for the cooling device 295*a* that may be used in compliance with the quiet mode via an alternate setting adjustment to tune those settings that are allowed by the ITDM. In such a scenario, the OTB AI productivity tool 250 in an embodiment may update capabilities available by removing registered capabilities or adjusting the registered capabilities available for setting of any fan speeds, though allowable by the manufacturer of the cooling device 295*a*, that do not comply with the received ITDM-issued configuration policy with augmented alternate settings or reflect the user's selection of options or adjustments.

In yet another example, the AI productivity tool 250 may access an initial registered capabilities list of firmware or hardware capabilities that allows display according to the full range of viewing angles achievable by the display device 215*a*, as set according to the manufacturer of the display device 215*a*. The OTB AI productivity tool 250 in an embodiment may receive an ITDM-issued configuration policy with augmented alternate settings for a security mode that by default places the display device 215*a* in a privacy screen mode in which the viewing angle for the display device 215*a* is minimized to a minimum value to disallow viewing of the screen by others nearby the information handling system who are not authorized to view the displayed content. This setting of the security mode may be allowed by the ITDM for the user to increase the viewing angle to a value between the minimum value and the full range of viewing angles achievable by the display device 215*a* as manufactured via adjustment to an augmented alternate setting. In such a scenario, the OTB AI productivity tool 250 in an embodiment may adjust any firmware 215*b* or hardware 215*a* capabilities setting the display device 215*a* to use any viewing angles that do not comply with the received ITDM-issued configuration policy with augmented alternate settings, unless declined as an option by a user or adjusted by the user. In example embodiments, the user may provide such setting adjustments via a user query input or other input.

As yet another example, the AI productivity tool 250 may access an initial registered capabilities list of firmware or hardware capabilities that allows for full or unrestricted read and write operations via an external communications port 299, as set according to the manufacturer of the external communications port 299. The OTB AI productivity tool 250 in an embodiment may receive an ITDM-issued configuration policy with augmented alternate settings for a secure mode that by default places the external communications port 299 in a secure mode in which read or write operations to and from external devices via an external communications port 299 are limited, encrypted, or disabled, but allows for the user to temporarily or permanently enable read only or write only operations instead of disabling the external communications port 299, enable encrypted read or write operations instead of disabling the external communications port 299 or restricting read or write operations fully, or remove all encryption, read or write limitations for a trusted device. This setting of the ITDM-issued configuration policy with augmented alternate settings may be allowed by the ITDM to be optional or adjusted with augmented alternate settings. In such a scenario, the OTB AI productivity tool 250 in an embodiment may remove any external communication port 299 capabilities that do not comply with the ITDM-issued configuration policy with augmented alternate settings if disallowed or modify capabilities of the external communication port 299 if adjusted by a user to modify an augmented alternate setting to temporarily allow or have limited access. In another embodiment, the user may decline optional settings for the restriction of external communication port 299 capabilities entirely within the secure mode, and thus the initial capability may be restored in updated capabilities.

In still another example, the AI productivity tool 250 may access an initial registered capabilities list of firmware or hardware capabilities that allows for download and installation of unencrypted firmware (e.g., 207, 215*b*, 291*b*, 295*b*). The OTB AI productivity tool 250 in an embodiment may receive an ITDM-issued configuration policy with augmented alternate settings that by default places the information handling system in a secure mode in which only encrypted versions of firmware (e.g., 291*b*, 295*b*, 215*b*, 207) may be downloaded and installed on the information handling system, but allows for the user to temporarily or permanently enable download and installation of a specifically identified version of firmware (e.g., 291*b*, 295*b*, 215*b*, 207). In such a scenario, the OTB AI productivity tool 250 in an embodiment may remove or alter any firmware or hardware capabilities that do not comply with the ITDM-issued configuration policy with augmented alternate settings and any adjustments selected by the user to that setting.

Upon receipt of a user query input by the OTB AI productivity tool 250 in an embodiment, as described in greater detail below with respect to FIG. 3, a hardware processor executing code instructions of the OTB AI productivity tool 250 may then perform one or more similarity search methods to identify a responsive application, firmware or hardware capability that is responsive to a user query input, including a firmware or hardware capability given within a most recently updated list of firmware or hardware capabilities updated by the AI productivity tool-enableable platform service tool 280 in response to the received ITDM-issued configuration policy with augmented alternate settings and any user adjustments or rejection of settings therein where allowed by the ITDM. The hardware processor executing code instructions for the OTB AI productivity tool 250 may then instruct execution of the matching firmware or hardware capability, via communication and interface with the AI productivity tool-enableable platform service tool 280. Because the firmware or hardware capabilities available for matching in such a way are tailored to only reflect current hardware (e.g., 208, 215*a*, 291*a*, 295*a*) configuration and policies, and current versions and functionality of the AI productivity tool-enableable platform service tool 280 and firmware (e.g., 207, 215*b*, 291*b*, 295*b*), the hardware processor executing machine readable code instructions for the OTB AI productivity tool 250 may ensure that any commands to execute a capability via the AI productivity tool-enableable platform service tool 280 are in accordance with current ITDM-issued hardware (e.g., 208, 215*a*, 291*a*, 295*a*) configuration policies and alternate settings as adjusted by user inputs to tune or modify the same.

Figure 3:
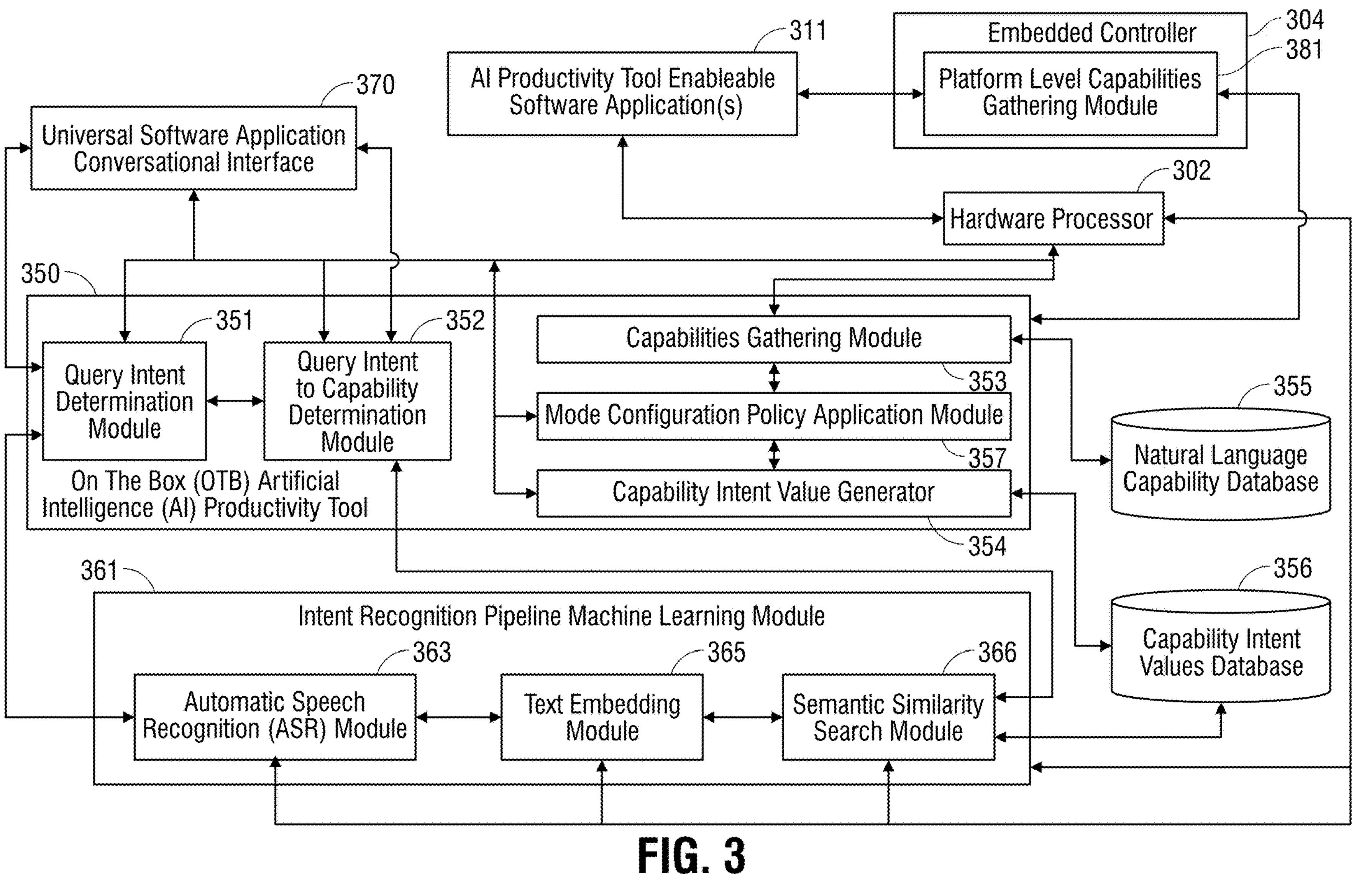
FIG. 3 is a block diagram illustrating a hardware processor executing machine readable code instructions of an OTB AI productivity tool for performing a semantic similarity search to identify a best match application capability, or firmware or software capability in compliance with ITDM-set configurations policy or appended alternate settings for a received user query input and adjusting ITDM-set configurations policy or appended alternate settings according to an embodiment of the present disclosure.

FIG. 3 is a block diagram illustrating an on the box (OTB) AI productivity tool for performing a semantic similarity search to identify one or more best match capabilities from updated application, firmware or hardware capabilities in compliance with a most recently received ITDM-issued configuration policy with augmented alternate settings and any user adjustments responsive to a received user query input at an information handling system according to an embodiment of the present disclosure. As described herein, a hardware processor 302 executing code instructions of the OTB AI productivity tool 350 may direct execution of application capabilities for one or more AI productivity tool enableable software applications 311 or for firmware or hardware capabilities as described above in FIG. 2 based on similarity matching with a user query input received at the OTB AI productivity tool 350.

Prior to such a process and prior to a user providing such a user query input into an OTB AI productivity tool 350, the embedded controller executing the platform level capabilities module 381 may register with the OTB AI productivity tool 350 an initial list of firmware or hardware capabilities, as described in greater detail above with respect to FIG. 2. The hardware processor 302 executing machine readable code instructions of a capabilities gathering module 353 may also register software capabilities of various AI productivity tool enableable software applications 311 with the OTB AI productivity tool 350 for form an initial list of capabilities available for matching with a user query input by the OTB AI productivity tool 350. Such an initial registration of application capabilities or firmware or hardware capabilities at an OTB AI productivity tool 350 may not take into account current configurations and policies set by an information technology decision maker (ITDM) managing a plurality of information handling system within an enterprise system for various required modes of operation. For example, modes may include a secure mode for members of a finance team of an enterprise to limit access to sensitive data. Other modes that may be propagated by an ITDM for the enterprise may include a focus mode, efficiency mode, quiet mode, turbo mode, or others depending on roles or functions of managed client information handling systems.

In an embodiment, the capability intent values database 356 may store a plurality of capabilities as the initial list of capabilities associated with each of a plurality of AI productivity tool-enablable software applications 311 or the AI productivity tool enableable platform tool 380 with a name, capability ID, natural language descriptor, or a capability intent value in some embodiments. These capabilities stored at the capability intent values database 356 may include any input and output capabilities provided by the AI productivity tool-enablable software applications 311 or the AI productivity tool enableable platform tool 380 being executed by the hardware processor 302 or any other hardware processing devices, such as embedded controller 304. For example, an AI productivity tool-enablable software application 311 may include a word processing application such as Microsoft® Word® that may receive input (e.g., via voice at a microphone 183 or text via a keyboard 190 of FIG. 1) and provide output via text. Still further, other examples of an AI productivity tool-enablable software application 311 may include an updating software, virus protection software, and setting optimization software such as Dell® SupportAssist® module executable by the hardware processor 302 or other hardware processing resource of the information handling system. With SupportAssist® a user may provide input via, for example, the microphone requesting information related to a setting associated with the information handling system. Thus, capabilities of SupportAssist® may include virus protection capabilities, setting hardware or firmware configurations, managing file storage, adjusting power settings, and software updating capabilities that may each be stored at the capability intent values database 356. The capabilities intent values database 356 may be merged with or separate from a natural language capabilities database 355 in various embodiments having natural language descriptions associated with available registered capabilities for the OTB AI productivity tool 350. In an embodiment, the capability intent values are embedded from natural language descriptions of capabilities.

Even further, examples of an AI productivity tool-enablable software application 311 may include Dell® Display®/Peripheral Manager®. The Dell® Display®/Peripheral Manager® may have capabilities that include optimization of screen resolution, refresh rates, display device viewing angles, and gamma correction as well as external communication port settings, webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® software may have capability intent values and a capability identifier stored at the capability intent values database 356 and natural language description in the natural language capability database 355 as described herein. It is appreciated that the AI productivity tool-enablable software application 311 may include, for example, Dell® Trusted Device® software, a remediation Dell® APEX Managed Device Service (AMDS)® software, Alienware Command Center (AWCC)® software, among others. Some AI productivity tool-enablable software applications 311 or the AI productivity tool enableable platform tool 380 may even be subagents operating locally on the box of the information handling system but have remote access to a larger software application executing at a cloud based server location for providing software services in some embodiments herein.

The ITDM for enterprises may issue one or more ITDM-issued configuration policies with augmented alternate settings for a plurality of information handling systems within the enterprise to control functionality of various AI productivity tool enableable software applications 311, firmware, or hardware components at individual information handling systems according to one or more operation modes. In some cases, some or all of each of these ITDM-issued configuration policies with augmented alternate settings may be adjustable or tunable by the user within parameters preset by the ITDM. For example, an ITDM-issued configuration policy with augmented alternate settings may configure a plurality of information handling systems to set a default clock speed to a defined maximum for the hardware processor 302 to conserve battery power while in a power savings mode. However, such a configuration may cause processing to slow down below user preferences for some users. Thus, some users may wish to increase the allowed maximum processor clock speed for the power savings mode to a level below the default or manufacturer defined maximum speed for the hardware processor 302. In order to accommodate user's wishes to tweak or tune these policy settings, an ITDM in an embodiment may transmit augmentable alternate settings for the given ITDM-issued configuration policy with augmented alternate settings that a user may choose to tailor the configurations policy to the user's preferences. For example, a user may make adjustments, via a user query input or otherwise, for increasing the allowed maximum processor clock speed for the power savings mode to an allowed level that is below the default or manufacturer defined maximum speed for the hardware processor 302. In other embodiments, the maximum processor clock speed for the power savings mode may be an optional setting among a plurality of settings, some of which are not optional, and the user may reject this particular setting via an augmented alternate setting for this to be removed as a limitation.

In another example, an ITDM-issued configuration policy with augmented alternate settings may configure a plurality of information handling systems to set a default clock speed for the hardware processor 302 to a default maximum (e.g., 80% of a manufacturer's allowable maximum) to extend the life of the hardware processor 202. However, such a configuration may cause processing to slow down below user preferences. Some users may wish to increase the allowed maximum processor clock speed for short periods of time by placing the hardware processor 202 in a turbo mode that allows the processor speed to increase above the default maximum. In order to accommodate user's wishes to tweak or tune these policy settings of the ITDM-issued configuration policy with augmented alternate settings, an ITDM in an embodiment may transmit augmentable alternate settings for the given configurations policy that a user may choose to tailor the ITDM-issued configuration policy with augmented alternate settings for a particular configuration setting to the user's preferences, such as increasing the allowed maximum processor clock speed for the turbo mode for brief periods of time. In other embodiments, one or more settings as part of an ITDM-issued configuration policy with augmented alternate settings for a mode may be optional and removed if a user opts out or attempts to change the policy configuration setting. Other settings of the ITDM-issued configuration policy with augmented alternate settings for a mode may not be optional in some embodiments.

As another example, an ITDM-issued configuration policy with augmented alternate settings may configure a plurality of information handling systems to restrict downloading of software applications to specifically-allowed enumerated software applications. However, such a configuration may negatively impact user experience. Some users may wish to download software applications that are not on the specifically enumerated list, but are still available from trusted sources in an encrypted and secure format. In order to accommodate user's wishes to tweak or tune these policy settings, an ITDM in an embodiment may transmit alternate settings for the given ITDM-issued configuration policy with augmented alternate settings that a user may choose to tailor the ITDM-issued configuration policy to the user's preferences, such as by expanding the software applications available for download at the information handling system to include all applications from a trusted source, as defined by an ITDM. Thus, a registered, responsive capability may be altered and updated for a particular managed information handling system in customizing the ITDM-issued configuration policy with augmented alternate settings.

In yet another example, an ITDM-issued configuration policy with augmented alternate settings may configure a plurality of information handling systems to restrict usage of hardware processing resources by one or more software applications to a first maximum processor usage value. However, such a configuration may negatively impact user experience by slowing down those software applications. Some users may wish to increase the speed of one or more of those software applications. In order to accommodate user's wishes to tweak or tune these policy settings, an ITDM in an embodiment may transmit alternate settings for the given ITDM-issued configuration policy with augmented alternate settings that a user may choose to tailor the configurations policy to the user's preferences, such as by resetting the restriction on hardware processing resources consumed by a specifically user-identified software application to a second maximum processor usage value that exceeds the first maximum processor usage value. Such a user alteration may be used to update responsive capabilities with customization of the ITDM-issued configuration policy with augmented alternate settings.

In yet another example, an ITDM-issued configuration policy with augmented alternate settings may configure a plurality of information handling systems to disable push notifications from a plurality of software applications. However, such a configuration may negatively impact user experience. Some users may wish to allow push notifications from one of or a subset of the plurality of software applications for which push notifications are generally disabled. In order to accommodate user's wishes to tweak or tune these policy settings, an ITDM in an embodiment may transmit alternate settings for the given ITDM-issued configuration policy with augmented alternate settings that a user may choose to tailor the configurations policy to the user's preferences, such as by allowing the user to select one or more of the plurality of software applications for which push notifications may be enabled. This customization of the ITDM-issued configuration policy with augmented alternate settings may be used to update responsive capabilities.

As yet another example, an ITDM-issued configuration policy with augmented alternate settings may configure a plurality of information handling systems to automatically delete all temporary files at a preset frequency (e.g., every day, every week, every month). However, such a configuration may negatively impact user experience if the user relies on those temporary files for a time period exceeding the preset frequency. Some users may wish to decrease the preset frequency in order to allow for longer periods of access, or to disable this automatic functionality altogether for certain types of files. In order to accommodate user's wishes to tweak or tune these policy settings, an ITDM in an embodiment may transmit alternate settings for the given ITDM-issued configuration policy with augmented alternate settings that a user may choose to tailor the configurations policy to the user's preferences, such as by allowing the user to select types of files that will not be automatically deleted, to increase the frequency with which such automatic deletion occurs, or to opt out of this particular configuration setting when it is optional. Such a customization of the ITDM-issued configuration policy with augmented alternate settings may cause alteration or removal of a capability as an update to the capabilities list.

Each of the ITDM-issued configuration policy with augmented alternate settings that may be used for customization or removal of particular configuration settings described directly above or in other embodiments may be updated capabilities or removal of capabilities from a list of available capabilities executable via one or more AI productivity tool enableable software applications 311. For example, the hardware processor 302 executing machine readable code instructions for the Dell® SupportAssist® AI productivity tool enableable software application 311 may apply or institute each of those customized ITDM-issued configuration policy with augmented alternate settings described directly above, as well as the setting of firmware or hardware such as fan speed, battery power draw restrictions, and restrictions on the download and installation of unencrypted firmware versions, in updated available configurations for an AI productivity tool 350 as described in greater detail above with respect to FIG. 2.

Other types of AI productivity tool enableable software applications 311, such as the Dell® Display®/Peripheral Manager® software may be capable of instituting or applying other ITDM-issued configuration policy with augmented alternate settings and customizations by a user as updated sets or lists of available capabilities. For example, the hardware processor 302 executing machine readable code instructions for the Dell® Display®/Peripheral Manager® software may institute or apply a ITDM-issued configuration policy with augmented alternate settings to place a display device in a privacy mode in which a user may choose from a limited set of available viewing angles as augmentable alternate settings from a default privacy mode viewing angle. As another example, the hardware processor 302 executing machine readable code instructions for the Dell® Display®/Peripheral Manager® software may institute or apply an ITDM-issued configuration policy with augmented alternate settings to place an external communication port in a secure mode in which a user may enable read only or write only operations instead of disabling the external communications port 299, enable encrypted read or write operations instead of disabling the external communications port 299, or restricting read or write operations fully, or remove all encryption, read or write limitations for a trusted device, as customizations that may be implemented in updated capabilities available to the OTB AI productivity tool 350.

Such ITDM-issued configuration policy with augmented alternate settings may disallow, limit or otherwise adjust some or all settings for the pre-registered initial list of application capabilities for the various AI productivity tool enableable software applications 311 or the firmware or hardware capabilities. Thus, each time the ITDM institutes a new generalized ITDM-issued configuration policy with augmented alternate settings, the actual list of application capabilities and firmware or hardware capabilities performable via the OTB AI productivity tool 350 in accordance with those ITDM-issued configuration policy with augmented alternate settings may change or capabilities within may be altered and updated. In embodiments herein, the OTB AI productivity tool 350 may execute a mode configuration policy application module 357 to amend the list of registered application capabilities or firmware or hardware capabilities or alter those capabilities including their capability intent values registered in the natural language capabilities database 355 and capability intent values database 355 for access by the OTB AI productivity tool 350 instructing execution of such application capabilities or firmware or hardware capabilities in response to a user query input.

A hardware processor 302 for an information handling system executing machine readable code instructions for the OTB AI productivity tool 350 with a mode configuration policy application module 357 in an embodiment may receive ITDM-issued configuration policy with augmented alternate settings. The hardware processor executing machine readable code instructions of the mode configuration policy application module 357 amends and updates registered the available capabilities at the natural language capabilities database 355 and capability intent values database 356 in accordance with the ITDM-issued configuration policy and any augmented alternate settings or customization alterations by the user according to embodiments herein. The mode configuration policy application module 357 executes with the capabilities gathering module 353 and the capability intent value generator 354 in embodiments herein to amend or update capabilities in the natural language capabilities database 355 and capability intent values database 356. In this way, the OTB AI productivity tool only instructs performance of updated application capabilities or firmware or hardware capabilities that are registered in accordance with the current generalized ITDM-issued configuration policy with augmented alternate settings. This updated list of capabilities (also called capability intents and having capability intent values) may describe those functionalities of each of one or more AI productivity tool enablable software applications 311, or versions of firmware for one or more hardware components that may be executed when interfacing with the OTB AI productivity tool 350. Updated natural language descriptions or updated capability intent values of the firmware or hardware capabilities and any software capabilities of AI productivity tool-enableable software applications 311 may be stored within a natural language capability database 355 and capability intent values database 356 for comparison to received user query inputs, for example, in order to identify a responsive application, firmware or hardware capability most likely to address a user's request within the received user query inputs.

As described below, some application capabilities or firmware or hardware capabilities for hardware, including firmware drivers for the hardware components, are accessible as registered capabilities as part of the OTB AI productivity tool 350, but execution of the application capabilities or firmware or hardware capabilities may or may not be in compliance with current generalized ITDM-issued configuration policy with augmented alternate settings. Further, these generalized ITDM-issued configuration policy with augmented alternate settings may be routinely adjusted by a user in compliance with the augmented alternate settings accompanying these generalized configuration policies. The hardware processor 302 executing machine readable code instructions for an OTB AI productivity tool 350 and the mode configuration policy application module 357 in an embodiment may address this issue by updating the initial list of firmware or hardware capabilities and initial list of application capabilities stored at a natural language capabilities database 355 to include only amended or altered capabilities in compliance with most recently received ITDM-issued configuration policy with augmented alternate settings and remove capabilities that no longer available.

For example, the hardware processor 302 executing machine readable code instructions for mode configuration policy application module 357 of the OTB AI productivity tool 350 may register an updated list of application capabilities for the Dell® SupportAssist® AI productivity tool enableable software application 311 to alter or remove initially registered application capabilities that are not in compliance with a most recently received generalized ITDM-issued configuration policy with augmented alternate settings to restrict a processor clock speed for a power savings mode to a user-specified level below the default or manufacturer defined maximum speed for the hardware processor 302. In another example, the hardware processor 302 executing machine readable code instructions for the mode configuration policy application module 357 of the OTB AI productivity tool 350 may register an updated list of application capabilities for the Dell® SupportAssist® AI productivity tool enableable software application 311 to alter or remove initially registered application capabilities that are not in compliance with a most recently received generalized ITDM-issued configuration policy with augmented alternate settings to allow the user to increase an allowed maximum processor clock speed for a short duration of time while the information handling system is placed in turbo mode. As another example, the hardware processor 302 executing machine readable code instructions for the mode configuration policy application module 357 of the OTB AI productivity tool 350 may register an updated list of application capabilities for the Dell® SupportAssist® AI productivity tool enableable software application 311 to alter or remove initially registered application capabilities that are not in compliance with a most recently received ITDM-issued configuration policy with augmented alternate settings to expand a list of software applications available for download at the information handling system from a pre-defined and enumerated list to include all applications from a trusted source, as defined by an ITDM. In yet another example, the hardware processor 302 executing machine readable code instructions of the mode configuration policy application module 357 for the OTB AI productivity tool 350 may register an updated list of application capabilities for the Dell® SupportAssist® AI productivity tool enableable software application 311 to alter or remove initially registered application capabilities that are not in compliance with a most recently received generalized ITDM-issued configuration policy with augmented alternate settings to reset a restriction on hardware processing resources consumed by a specifically user-identified software application to a second maximum processor usage value that exceeds the first maximum processor usage value applied to other software applications not identified by the user.

As still another example, the hardware processor 302 executing machine readable code instructions of the mode configuration policy application module 357 for the OTB AI productivity tool 350 may register an updated list of application capabilities for the Dell® SupportAssist® AI productivity tool enableable software application 311 to alter or remove initially registered application capabilities that are not in compliance with a most recently received generalized ITDM-issued configuration policy with augmented alternate settings to allow the user to select one or more of a plurality of software applications that may be excluded from a configuration policy that generally disables push notifications. In yet another example, the hardware processor 302 executing machine readable code instructions of the mode configuration policy application module 357 for the OTB AI productivity tool 350 may register an updated list of application capabilities for the Dell® SupportAssist® AI productivity tool enableable software application 311 to alter or remove initially registered application capabilities that are not in compliance with a most recently received generalized ITDM-issued configuration policy with augmented alternate settings to allow the user to select types of files that will not be automatically deleted as per a general configuration policy to automatically delete all temporary files at a preset frequency, or to increase the frequency with which such automatic deletion occurs. In still another example, the hardware processor 302 executing machine readable code instructions of the mode configuration policy application module 357 for the OTB AI productivity tool 350 may register an updated list of application capabilities for the Dell® SupportAssist® AI productivity tool enableable software application 311 to alter or remove initially registered application capabilities that are not in compliance with a most recently received generalized ITDM-issued configuration policy with augmented alternate settings to set fan speed, battery power draw restrictions, and restrictions on the download and installation of unencrypted firmware versions.

The hardware processor 302 executing machine readable code instructions of the mode configuration policy application module 357 for the OTB AI productivity tool 350 may register an updated list of application capabilities for the Dell® Display®/Peripheral Manager® software AI productivity tool enableable software application 311 to alter or remove other initially registered application capabilities that are not in compliance with a most recently received generalized ITDM-issued configuration policy with augmented alternate settings, such as setting a display device to display outside of a user-defined viewing angle allowed by an ITDM that has placed the display device in privacy mode. In another example, the hardware processor 302 executing machine readable code instructions of the mode configuration policy application module 357 for the OTB AI productivity tool 350 may register an updated list of application capabilities for the Dell® Display®/Peripheral Manager® software AI productivity tool enableable software application 311 to alter or remove other initially registered application capabilities that are not in compliance with a most recently received generalized ITDM-issued configuration policy with augmented alternate settings, such as capabilities that allow for completely unrestricted read and write operations via an external communication port, unencrypted read and write operations, or unrestricted read and write operations with devices not defined as trusted devices, for example. In this way, the hardware processor 302 executing machine readable code instructions for the OTB AI productivity tool 350 may ensure that any commands to execute functionality of responsive capabilities for updated, registered AI productivity tool enableable software application 3111 capabilities, or firmware or hardware capabilities that are in accordance with most recent generalized ITDM-issued configuration policies and alternate settings for those configuration policies, as allowed by an ITDM in embodiments herein.

A hardware processor executing machine readable code instructions for a capability intent value generator 354 embedding process of the OTB AI productivity tool 350 may operate with the mode configuration policy application module 357 determine capability intent values associated with these natural language descriptions of the updated application capabilities or firmware or hardware capabilities adjusted based on receipt of generalized ITDM-issued configuration policy with augmented alternate settings at the mode configuration policy application module 357, as they are updated for inclusion in the capability intent values database 356. These capability intent values are a mathematical representation, such as a vectorized capability intent value in a multi-axis vector space, of capability operations or services of software capabilities of AI productivity tool enableable software applications 311 at the OS level as well as firmware or hardware capabilities at the platform level in embodiments herein. Such capability intent values as vectors are used in a natural language processing method of execution of a large language model (LLM) for an OTB AI productivity tool 350 to determine and correlate the user's query intent or requested action within a user query input that takes into account the context or semantics of the words used within the user query input with one of a plurality of software capabilities of AI productivity tool enableable software applications 311 or firmware or hardware capabilities at the platform level.

Firmware or hardware capabilities relate to platform level firmware or hardware capability actions to control one or more versions of firmware (e.g., 207, 215*b*, 291*b*, 295*b* of FIG. 2) for one or more hardware components (e.g., 208, 215, 291*a*, 295*a* of FIG. 2) that may closely correspond and can address the user request within the user query input. The hardware processor 302 executing code instructions for the OTB AI productivity tool 350 may then instruct execution of a matching firmware or hardware capability at the platform level via an embedded controller executing the AI productivity tool-enableable platform service tool 380. The firmware or hardware capabilities available for matching in such a way are tailored to only reflect current hardware (e.g., 208, 215*a*, 291*a*, 295*a* of FIG. 2) configuration and policies and current versions and functionality of the AI productivity tool-enableable platform service tool 380 and firmware (e.g., 207, 215*b*, 291*b*, 295*b* of FIG. 2) via updating to the registered firmware or hardware capabilities at the OTB AI productivity tool 350 at the OS level. Thus, an embedded controller 304 executing machine readable code instructions for a platform level capabilities gathering module 381 may ensure that any commands to execute a responsive firmware or hardware capability via the AI productivity tool-enableable platform service tool 380 are in accordance with current hardware (e.g., 208, 291*a*, 293*a*, 295*a* of FIG. 2) configuration and policies according to embodiments herein.

The OTB AI productivity tool 350 in an embodiment may receive, via a universal user conversational interface software application 370 or other interface, a voice, image, or text input from a user, described herein as a user query input, that requests actions or services of the AI productivity tool 350. These actions or services may include software capabilities of one or more AI productivity tool-enableable software applications 311 executing at the OS level in some embodiments. These actions or services may also include firmware or hardware capabilities executable through the AI productivity tool-enableable platform service tool 380 for one or more versions of firmware (e.g., 207, 215*b*, 291*b*, 295*b* of FIG. 2), or one or more hardware components (e.g., 208, 215*a*, 291*a*, 295*a* of FIG. 2). A hardware processor 302 executing code instructions of the OTB AI productivity tool 350 in an embodiment may match these received user query inputs to known application and firmware or hardware capabilities, including updated firmware or hardware capabilities and updated application capabilities that have been updated by the mode configuration policy application module 357 in compliance with a most recently received ITDM-issued configuration policy with augmented alternate settings.

A query input received by the OTB AI productivity tool 350 is processed into a query intent vector value for semantic or lexical matching with available application, firmware or hardware capabilities in the natural language capabilities database 355 or the capability intent values database 356 in embodiments. Updated application, firmware or hardware capabilities registered and updated by the mode configuration policy application module 357 of the OTB AI productivity tool 350 are provided text descriptors that may be processed into vectorized capability intent values in a multi-axis vector space via embedding algorithm applied to the natural language descriptions of the updated application, firmware or hardware capabilities. These embedded vectorized capability intent values for both updated application capabilities and updated firmware or hardware capabilities are mathematical representations that may be correlated by a semantic similarity matching algorithm to a query intent value generated via an embedding a user query input to select a responsive application, or firmware or hardware capability that is a best match or meets a threshold similarity search score to be responsive to a user query input from a user.

This process of an execution of the OTB AI productivity tool 350 includes updating an initial registration of application, firmware or hardware capabilities received from the AI productivity tool-enableable platform service tool 380 or the plurality of AI productivity tool enableable software applications 311 via the mode configuration policy application module 357 to comply with or one or more configurations of AI productivity tool enableable software applications 311, firmware (e.g., 207, 215*b*, 281*b*, 295*b* of FIG. 2) or hardware components (e.g., 208, 215*a*, 291*a*, 295*a* of FIG. 2) as described in greater detail above with respect to FIG. 2. These updated application capabilities and updated firmware or hardware capabilities for the one or more versions of firmware (e.g., 207, 215*b*, 293*b*, 295*b* of FIG. 2) or one or more hardware components (e.g., 208, 215*a*, 291*a*, 295*a* of FIG. 2) may be stored within the natural language capability database 355 by the capabilities gathering module 353 or embedded in application, firmware or hardware capability intent values in the capability intent values database 356 by the capability intent value generator 354 applying an embedding algorithm for comparison to received user query inputs, for example.

The hardware processor 302 executing machine readable code instructions of the OTB AI productivity tool 350 may determine application, firmware or hardware capability intent values associated with natural language descriptions of the initial application capabilities, initial firmware or hardware capabilities, updated application capabilities or updated firmware or hardware capabilities. These initial application capabilities, initial firmware or hardware capabilities, updated application capabilities or updated firmware or hardware capabilities intent values are a mathematical representation of the natural language descriptions of capability operations or services from the one or more AI productivity tool-enableable software applications 311 or the AI productivity tool-enableable platform service tool 380 managing firmware or hardware capability actions to control one or more versions of firmware (e.g., 207, 215*b*, 291*b*, 295*b* of FIG. 2), or one or more hardware components (e.g., 208, 215*a*, 291*a*, 295*a* of FIG. 2) in an embodiment. These application or firmware or hardware capability intent values may be represented by a mathematical value in a multi-axis vector space that may be associated with the natural language description for that capability or intent. In an embodiment, the application or firmware or hardware capabilities may also be associated with an identification (ID) such as an alphanumeric ID that may be stored within a capability intent values database 356. Generating such application, firmware or hardware capability intent values as vectors may be a first step in a natural language processing method to determine application, firmware or hardware capability corresponding to and responsive to the user's intent or requested action within a user query input that takes into account the context or semantics of the words used within the user query input.

In an embodiment, the capability intent values database 356 may store a plurality of application, firmware or hardware capability intent values of capabilities embedded via an embedding algorithm of the capability intent value generator 354 from the natural language descriptions of capabilities in the natural language capability database 355. The capability intent values database 356 may store include a name, capability ID, natural language descriptor, or a capability intent value for each available application, firmware or hardware capability in some embodiments. It is understood that in some embodiments, the natural language capability database 355 and the capability intent values database 356 may be the same database whereas in other it may be a distributed database. These application and firmware or hardware capabilities stored at the capability intent values database 356 may further include any input and output for the application, firmware or hardware capabilities executable by the hardware processor 302 or any other hardware processing devices, such as embedded controller 304.

The application, firmware or hardware capabilities may be registered with the OTB AI productivity tool 350 in an embodiment for establishing capability intent values for these application, firmware or hardware capabilities such that chat user query input embedded as query intent values may be correlated with one or more application, firmware or hardware capability intent values for registered application, firmware or hardware capabilities, as described herein. For example, a hardware processor 302 executing machine readable code instructions of the OTB AI productivity tool 350 may update initial lists of application, firmware or hardware capabilities that adds or removes a previously stored a natural language descriptions of application, firmware or hardware capabilities to comply with current ITDM-issued configuration policy with augmented alternate settings therefor. The application, firmware or hardware capability intent values for registered application, firmware or hardware capabilities are a vectorized mathematical representation in a multi-axis vector space of the natural language descriptions of capability operations or services from AI productivity tool-enableable software applications 311 or the one or more versions of firmware (e.g., 207, 215*b*, 291*b*, 295*b* of FIG. 2), or one or more hardware components (e.g., 208, 215*a*, 291*a*, 295*a* of FIG. 2) managed via the embedded controller 304 executing the AI productivity tool-enableable platform service tool 380 in an embodiment. The application, firmware or hardware capability intent values are generated using natural language processing (NLP) techniques via execution of machine readable code instructions by the hardware processor 302 of the query intent determination module 351 and the text embedding module 365 in an example embodiment. Each axis of the multi-axis vector space may provide a measurement of various meaning value attributes of a text excerpt of words or phrases that are known to provide context or semantic understanding of the text. For example, one or more axis values may represent a reader's understanding of a given text excerpt may depend upon the reader's knowledge of any given word's meaning within the text, identified phrases within the text, or the understood order or sequence of words within the text. More specifically, one or more axis values may represent the reader's understanding as enhanced with a larger vocabulary and assigned values for which words in that vocabulary are synonyms (closer in meaning) to a given word in that text, and which words are antonyms (further away in meaning) to that given word. As another example, one or more axis values may represent the reader's ability to identify common phrases, such as "in other words" may provide greater insight to the semantic meaning of a text excerpt using this phrase than an understanding of each of the words "in," "other," and "words" used separately from one another would. As yet another example, one or more axis values may represent the importance of the order of certain words in an excerpt may impact semantic meaning of the excerpt. More specifically, the phrase "man bites dog" may have a completely different semantic or contextual meaning than the phrase "dog bites man," although each phrase has the same words, just in a different order.

Each axis of the multi-axis vector space, and thus, each value within a vector within such a multi-axis vector space may provide a measurement of these various attributes within a given initial or updated capability intent value in embodiments herein. Hundreds of vector axes may be the basis for the intent vector value in a multi-dimensional "space." For example, a vector for a user query input intent value or for capability intent value may provide a measurement of similarity between any given word within the user query input or the capabilities, respectively, a measurement of dissimilarity with known antonyms, identification of any given word as part of a phrase, or usage of any given word in a specific order that is known to be of importance. In such a way, the vectorized user query input intent value and application, firmware or hardware capability intent values may mathematically represent a reader's contextual or semantic understanding of the user query input and the natural language descriptors for the capabilities of the AI productivity tool enableable software application 311, the AI productivity tool-enableable platform service tool 380, one or more versions of firmware (e.g., 207, 215*b*, 291*b*, 295*b* of FIG. 2), or one or more hardware components (e.g., 208, 215*a*, 291*a*, 295*a* of FIG. 2). These vectors may then be compared to one another, via the hardware processor 302 executing machine readable code instructions of the semantic similarity search module 366 to determine statistical correlation, in order to understand how alike various phrases within the user query input and the application, firmware or hardware capabilities are, and how alike the usage of those words and phrases are to provide a context, such as influenced by the order of those words or phrases and their relation to one another, as well as other semantic factors represented in the multi-axis vector space.

The hardware processor 302 may also execute machine readable code instructions of a text embedding module 365 to detect which of these words are nouns, verbs, or commonly used sentence structures and generate a vectorized query input intent value for the user query input. These vectorized capability intent values and vectorized query input intent values may then be compared to one another, via the hardware processor 302 executing machine readable code instructions of the semantic similarity search module 366, in order to determine a statistical correlation that represents understanding how alike various phrases within the user query input and application, firmware or hardware capabilities are, and how alike the usage of those words and phrases are to provide a context, such as influenced by the order of those words or phrases and their relation to one another. For example, the hardware processor 302 executing machine readable code instructions of the semantic similarity search module 366, and in some embodiments in tandem with algorithms of the text embedding module 365 may compare the vectorized query input intent value with the application, firmware or hardware capability intent values stored within the capability intent value database 354 to identify a application, firmware or hardware capability intent value correlated to the query input intent value. This similarity matching correlation indicates that the user query input is requesting that the AI productivity tool-enableable software application 311 for a software capability execute or the AI productivity tool-enableable platform service tool 380 coordinate controls of one or more versions of firmware (e.g., 207, 291*b*, 293*b*, 295*b* of FIG. 2), for one or more hardware components (e.g., 208, 291*a*, 293*a*, 295*a* of FIG. 2) execute the firmware or hardware capability associated with that application, firmware or hardware capability intent value. Such a comparison, in an embodiment, may include, for example, determining a distance or a vector value difference between the vectorized query input intent value and the vectorized application, firmware or hardware capability intent value or a correlation value between the two. Examples of semantic similarity search module 366 algorithms may include, for example, a Cosine Similarity search machine learning model, a vector space model (VSM) similarity search machine learning model, or a K-Means Text Clustering similarity search machine learning model. These are only a few examples of semantic similarity search algorithms that may be employed and it is contemplated that any known or later-developed semantic similarity search algorithm may also be employed.

Upon determination of firmware or hardware capability intent value for each of the updated firmware or hardware capabilities determined by the OTB AI productivity tool 350 in an embodiment, the OTB AI productivity tool 350 may begin processing received user query inputs. The user query inputs are received at the universal conversational interface software application 370 or other interface for identification and execution of responsive application, firmware or hardware capabilities corresponding to one or more of these application, firmware or hardware capability intent values.

In an example embodiment, a user may provide a user query input in the form of text or voice data (e.g., via IO device 190, or microphone 191*a* of FIG. 1) to a universal user conversational interface software application 370, executing machine readable code instructions as a chatbot with the OTB AI productivity tool 350 to simulate a conversation between the user and OTB AI productivity tool 350. When a user provides a user query input in the form of text or voice data (e.g., via IO device 190, or microphone 191*a* of FIG. 1) to the universal user conversational interface software application 370, the hardware processor 302 executing machine-readable code instructions of the OTB AI productivity tool 350 in an embodiment may orchestrate assessment of the user's intended goals within the user query input (e.g., what the user wishes to achieve with this communication) with determination of a query input intent value. This user query input value is then used identify one or more application, firmware or hardware capabilities associated with the AI productivity tool-enableable software applications 311 or one or more versions of firmware (e.g., 207, 215*b*, 291*b*, 295*b* of FIG. 2) for one or more hardware components (e.g., 208, 215*a*, 291*a*, 295*a* of FIG. 2) managed by the AI productivity tool-enableable platform service tool 380 that have a correlating application, firmware or hardware capability intent value and that is capable of executing a response to this user query input intent. Further, the OTB AI productivity tool 350 may initiate performance of one or more tasks employing those application, firmware or hardware capabilities to achieve the user-intended results to the user query input.

This orchestration in an embodiment may begin with the hardware processor 302 executing machine-readable code instructions of the query intent determination module 351 to receive the user query input via microphone, image, or text input, and initiate execution of machine readable code instructions for an intent recognition pipeline machine learning module 361. In an embodiment, the hardware processor 302 executing machine-readable code instructions for the intent recognition pipeline machine learning module 361 may further orchestrate any combination of a plurality of machine learning modules (e.g., 363, 365, or 366) to process the audio, image, or text input to determine the user's intended goal or query intent within the received text or voice data of the user query input.

During operation for example, the hardware processor 302 executing machine-readable code instructions of the query intent determination module 351 may load one or more machine learning models such that, for example, the text or voice input from the user may be processed through a speech recognition model 363 and/or processed through any of a plurality of natural language models (e.g., 365 or 366) or other ML models in order to determine a text of a user's input query or a vectorized query intent value in multi-axis space of the user's input query. For example, an automatic speech recognition (ASR) module 363, a text embedding module 365, or a semantic similarity search module 366 that work in various combinations with one another to detect a user's audio speech input, conversion to text or detecting text, and detecting an intent, represented by generating a query intent vector value from the text of the user query input received from the universal user conversational interface software application 370 or other interface.

Further, the hardware processor 302 executing machine-readable code instructions of an intent recognition pipeline machine learning module 361 may orchestrate the interplay between each of the ASR module 363 and text embedding module 365 to establish a query intent vector value in a multi-axis vector space defined with these machine learning models, as well as a semantic similarity search module 366 to correlate that query intent value with a corresponding capability intent value in an embodiment. Several text embedding algorithms may be used in various embodiments herein in order to provide a vectorized mathematical representation of semantic understanding for a user query input or for a capability described in natural language. For example, the text embedding module 365 may employ a Latent Semantic Analysis (LSA) or Latent Dirichlet allocation (LDA) which may define how close each of the observed terms in the received user query input are to various synonyms. As another example, the text embedding module 365 may employ a Word2Vec algorithm, which includes a neural network trained to understand which terms or phrases should be considered closer or further away from certain synonyms or antonyms. As yet another example, the text embedding module 365 may employ a fully recurrent neural network trained to consider the order of terms within the received user query input. Similar text embedding algorithms may be applied to embed the natural language descriptors of the application, firmware or hardware capabilities in embodiments herein.

In an embodiment in which the user provides text data to the OTB AI productivity tool 350, the intent recognition pipeline machine learning module 361 may truncate this process to exclude processes of the ASR module 363 in example embodiments. The hardware processor 302 executing machine-readable code instructions of the intent recognition pipeline machine learning module 361 in an embodiment may apply the text embedding module 365 to generate a query intent value as described and then return the output query intent value of the text embedding module 365 to the query intent to capability determination module 352. The query intent to capability determination module 352 may utilize the semantic similarity search module 366 for a correlation between the query intent value received and a stored application, firmware or hardware capability intent value for available application, firmware or hardware capabilities.

In embodiments herein, a hardware processor 302 may execute machine readable code instructions for a semantic similarity search module 366, via a query intent to capability determination module 352, that compares the vectorized user query input intent value and the registered application, firmware or hardware capability intent values stored within the capability intent values database 356. Such a comparison may be performed using a semantic search machine learning model, such as a cosine or other semantic similarity search algorithm that compares the distance or value difference in a multi-axis vector space between two vectors to determine the contextual similarity between the embedded text of natural language description of the application, firmware or hardware capabilities having the generated application, firmware or hardware capability intent values and the natural language user query input having a user query input intent value generated from an embedded text algorithm. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability and query intent vector values. The cosine similarity search comparison or other semantic similarity search algorithm may be performed for several of the application, firmware or hardware capability intent values stored within the capability intent value database 356 to identify a best match application, firmware or hardware capability intent value that most closely matches the user query input value, according to embodiments herein.

A hardware processor 302 executing machine readable code instructions for a semantic similarity search module 366 may determine a distance, that is a value difference of the vector intent values within the multi-axis vector space between the query input intent value and each of a plurality of application, firmware or hardware capability intent values. Then, for each of those determined distances, the hardware processor 302 executing machine readable code instructions for a semantic similarity search module 366 may determine an angular similarity having a value between zero and one for the query input intent value and each of a plurality of application, firmware or hardware capability intent values. This angular similarity value in an embodiment may comprise the semantic similarity search score for a given application, firmware or hardware capability intent value, where zero is a worst match and one is a best match between the given application, firmware or hardware capability intent value and the query input intent value.

The hardware processor 302 in an embodiment may execute machine readable code instructions of an OTB AI productivity tool 350 query intent to capability determination module 352 to identify the natural language capability having a highest semantic similarity search score that meets a minimum threshold value (e.g., 0.5, 0.7, 0.9) as the best match application, firmware or hardware capability for the received user query input. In other embodiments, hardware processor 302 in an embodiment may execute machine readable code instructions of an OTB AI productivity tool 350 query intent to capability determination module 352 to identify the natural language capabilities having semantic similarity search scores that meet a threshold value (e.g., 0.7 or 0.9) as one or more best match application, firmware or hardware capability for the received user query input. In the case where no natural language capability has a semantic similarity search score meeting the minimum threshold value, this may indicate that the software or firmware action requested by the user within the user query input cannot be performed by AI productivity tool-enableable software applications 313 or the AI productivity tool-enableable platform service tool 380 managing one or more versions of firmware (e.g., 207, 291*b*, 293*b*, 295*b* of FIG. 2) for one or more hardware components (e.g., 208, 291*a*, 293*a*, 295*a* of FIG. 2). This may occur, for example, if the user is requesting execution or use of functionality not supported by the most recently received IDTM-issued configurations policy with augmented alternate settings. In such a scenario, the OTB AI productivity tool 350 may inform the user, via the universal user conversational interface software application 370 that the request action cannot currently be performed.

In other example embodiments, the OTB AI productivity tool 350 may identify one or more best match application, firmware or hardware capabilities for one or more AI productivity tool enableable software applications 311, one or more versions of firmware (e.g., 207, 215*b*, 291*b*, 295*b* of FIG. 2), or one or more hardware components (e.g., 208, 215*a*, 291*a*, 295*a* of FIG. 2) that meets the threshold similarity score value. Such matching responsive capabilities will execute in accordance with the current IDTM-issued configurations policy with augmented alternate settings received and applied according to embodiments herein to update the list of available capabilities by the mode configuration policy application module 357.

Upon identification of an updated application, firmware or hardware capability that addresses the determined query "intent" of the user within the received user query input, the hardware processor 302 executing machine-readable code instructions of the OTB AI productivity tool 350 may direct execution of one or more processes at the AI productivity tool-enableable platform service tool 380 managing the one or more versions of firmware (e.g., 207, 291*b*, 293*b*, 295*b* of FIG. 2), or one or more hardware components (e.g., 208, 291*a*, 293*a*, 295*a* of FIG. 2) associated with that firmware or hardware capability at the platform level, or may direct execution of one or more processes at the AI productivity tool enableable software application 313 associated with that application capability. In such a way, the OTB AI productivity tool 350 may implement a number of actions or utilizes services of the AI productivity tool enableable software application 311, or the AI productivity tool-enableable platform service tool 380 for the one or more versions of firmware (e.g., 207, 291*b*, 293*b*, 295*b* of FIG. 2), or one or more hardware components (e.g., 208, 291*a*, 293*a*, 295*a* of FIG. 2) based on the natural language of a received user query input at the OS level to trigger platform level firmware or hardware capability actions that are currently supported by most recently received configuration policies and appended alternate settings therefor.

Figure 4:
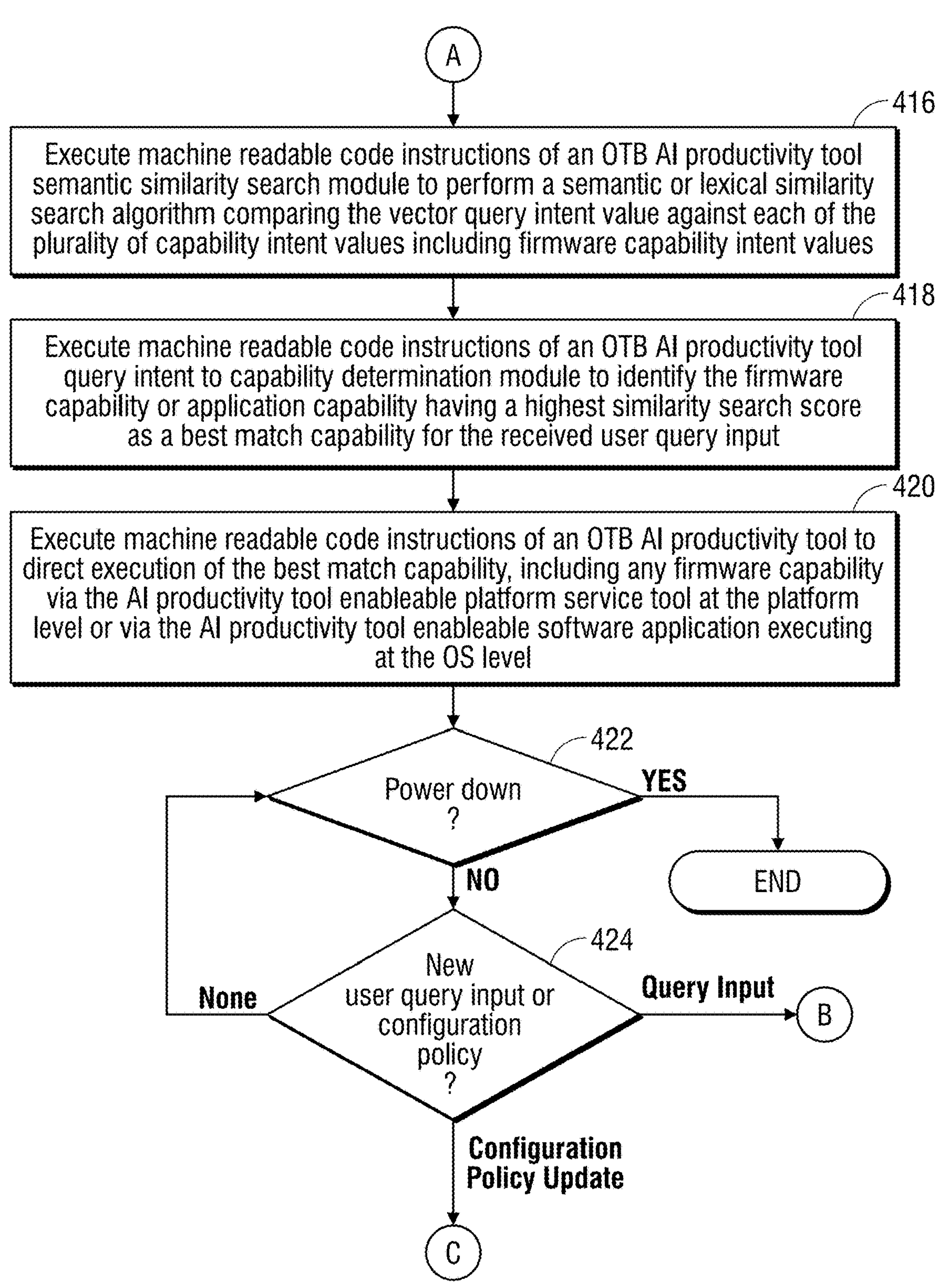
FIG. 4 is a flow diagram illustrating a method of a hardware processor or embedded controller executing machine readable code instructions to automatically update ITDM-set configurations policy or appended alternate settings for application, firmware or hardware capabilities accessible by an OTB AI productivity tool for responding to received user query inputs according to an embodiment of the present disclosure.

FIG. 4 is a flow diagram illustrating a method of a hardware processor executing machine readable code instructions to update and execute an updated list of application, firmware or hardware capabilities for AI productivity tool enableable software applications, firmware or a hardware component that is in accordance with a most recently received IDTM-issued configurations policy with augmented alternate settings for an on the box (OTB) artificial intelligence (AI) productivity tool according to an embodiment of the present disclosure. As described herein, a hardware processor for an information handling system executing machine readable code instructions of a mode configuration policy application module for the OTB AI productivity tool in an embodiment may apply alterations or restrictions to performance of application capabilities or firmware or hardware capabilities that are registered with an OTB AI productivity tool in accordance with current generalized ITDM-issued configuration policy with augmented alternate settings, as set by an ITDM from an enterprise managing the information handling system.

At block 402, a hardware processor in an embodiment may execute machine readable code instructions of an artificial intelligence (AI) productivity tool enableable platform service tool operating at a platform level, below operating system (OS) level of information handling system, to register a default list of firmware or hardware capabilities with an on the box (OTB) AI productivity tool operating at OS level. The firmware or hardware capabilities registered with the OTB AI productivity tool may include natural language descriptions for registration and storage at a natural language capabilities database with firmware or hardware capabilities for a plurality of versions of firmware or hardware components for the information handling system. These registered firmware or hardware capabilities may further be embedded as firmware or hardware capability intent values for storage in a capability intent values database with software capability intent values of AI productivity tool-enableable software applications for a registration of available responsive capabilities accessible by the OTB AI productivity tool.

For example, in an embodiment, the AI productivity tool-enableable platform service tool may register firmware or hardware capabilities of one or more versions of firmware for one or more hardware components with the OTB AI productivity tool that are firmware or hardware capabilities achievable by the AI productivity tool enableable platform service tool. In one example embodiment, a firmware or hardware capability may describe functionalities for a battery, such as firmware adjustments for various power mode settings such as a power saving mode for a PMU and the battery. In another example embodiment, a firmware or hardware capability registered at the OTB AI productivity tool may include functionalities of the display device with firmware or hardware capabilities capable to decrease or minimize a viewing angle for the display device. In still another example embodiment, a firmware or hardware capability registered at the OTB AI productivity tool may include functionalities of the cooling device firmware to adjust settings for a cooling device according to a user selectable thermal table (USTT) that is updatable which may cause a firmware or hardware capability to adjust increasing or decreasing fan speed. The above are some examples of firmware or hardware capabilities for hardware components operating at the platform level of the information handling system that may be registered firmware or hardware capabilities and it is contemplated that any firmware or hardware components operating at the firmware level may be included as registered firmware or hardware capabilities with the OTB AI productivity tool by the AI productivity tool enableable platform service tool.

These initial firmware or hardware capabilities registered with the OTB AI productivity tool in an embodiment may include any functionality allowed or supported by the firmware or hardware component described within these initial firmware or hardware capabilities. For example, the initial firmware or hardware capabilities list for a cooling device may include the full range of fan speeds achievable by the cooling device itself, as set according to the manufacturer of the cooling device. As another example, the initial firmware or hardware capabilities list for a display device may include the full range of viewing angles achievable by the display device, as set according to the manufacturer of the display device. As yet another example, the initial firmware or hardware capabilities list for a battery may include the full range of battery power consumption rates allowable by the manufacturer of the battery. In still another example, the initial firmware or hardware capabilities list for an external communications port may include full input and output access between an external device and the information handling system, as operatively coupled via the external communication port. Such a registration of initial firmware or hardware capabilities at the platform level capabilities gathering module may not take into account current IDTM-issued configurations policy for the various firmware, or those hardware components, as set by an information technology decision maker (ITDM) managing a plurality of information handling systems within an enterprise system.

In an embodiment at block 404, a hardware processor may execute machine readable code instructions of AI productivity tool enableable software application to register an initial list of application capabilities with the OTB AI productivity tool operating at OS level. For example, in an embodiment described with reference to FIG. 3, the hardware processor 302 executing various AI productivity tool enableable software applications 311 may register with the OTB AI productivity tool 350 an initial list of application capabilities achievable by the various AI productivity tool enableable software applications 311. Such an initial registration of application capabilities or firmware or hardware capabilities at an OTB AI productivity tool 350 may not take into account current IDTM-issued configurations policy with augmented alternate settings for the various AI productivity tool enableable software applications 311, firmware, or those hardware components, as set by an information technology decision maker (ITDM) managing a plurality of information handling system within an enterprise system.

In an embodiment, the capability intent values database 356 may store a plurality of capabilities associated with each of a plurality of AI productivity tool-enablable software applications 311 or the AI productivity tool enableable platform tool 380 with a name, capability ID, natural language descriptor, or a capability intent value in some embodiments. These capabilities stored at the capability intent values database 356 may include any input and output capabilities provided by the AI productivity tool-enablable software applications 311 or the AI productivity tool enableable platform tool 380 being executed by the hardware processor 302 or any other hardware processing devices, such as embedded controller 304. For example, an AI productivity tool-enablable software application 311 may include an updating software, virus protection software, and setting optimization software such as Dell® SupportAssist® module executable by the hardware processor 302 or other hardware processing resource of the information handling system to provide virus protection capabilities, set hardware or firmware configurations, manage file storage, adjust power settings, and control software updating. In another example, an AI productivity tool-enablable software application 311 may include Dell® Display®/Peripheral Manager®, which may operate to optimize or set screen resolution, refresh rates, display device viewing angles, and gamma correction as well as external communication port settings, webcam settings, mouse settings, keyboard settings, stylus settings, microphone settings, and trackpad settings, among other settings and connections associated with the wired or wireless input/output devices.

At block 406, the hardware processor executing machine readable code instructions of the OTB AI productivity tool may receive, via a network interface device, a generalized IDTM-issued configurations policy with augmented alternate settings from an information technology decision maker (ITDM) dictating one or more controlled configurations of hardware, firmware, or software applications, and identification of one or more augmented alternate settings for those controlled configurations usable to customize settings. For example, in an embodiment described with respect to FIG. 2, the ITDM for enterprises may issue an IDTM-issued configurations policy with augmented alternate settings for a plurality of information handling systems within the enterprise to control functionality of various AI productivity tool enableable software applications, firmware (e.g., 207, 215*b*, 295), or hardware components (e.g., 208, 215*a*, 295*a*, 299) at individual information handling systems. In some cases, these policies may be adjustable or tunable by the user within parameters preset by the ITDM.

For example, an IDTM-issued configurations policy with augmented alternate settings may configure a plurality of information handling systems to operate in a quiet mode in which fan speed for the cooling device 295_a_ is automatically lowered in order to decrease noise emission. However, such a configuration may cause processing speed to decrease as the temperature within the information handling system increases, due to the ITDM-set decrease in fan speed to cool down the information handling system. Some users may wish to increase the fan speed for cooling device 295_a_ in order to also increase the hardware processor (e.g., 102 of FIG. 1) speed while the information handling system is in quiet mode. Alternatively, some users may wish to lower the fan speed even further than the lowered value dictated by the quiet mode configurations policy, to further decrease noise levels. In order to accommodate the user's wishes to tweak or tune these policy settings, an ITDM in embodiments herein may transmit augmentable alternate settings for a given IDTM-issued configurations policy with augmented alternate settings (e.g., set the information handling system to quiet mode) that a user may choose to tailor the policy for particular settings to the user's preferences, such as a range of fan speeds for the cooling device 295_a_ that may be used in compliance with the quiet mode, to augment the policy-mandated lowered fan speed. This is only one example of an IDTM-issued configurations policy with augmented alternate settings, and others may include policies relating to power consumption, battery conservation, security, data storage, or other system operation optimization methods or modes. Example embodiments of IDTM-issued configurations policy with augmented alternate settings and their application and customization by augmenting alternate settings or opting out of optional settings for various modes of operation dictated by the ITDM-issued policy is described in embodiments of the present disclosure. These IDTM-issued configurations policy with augmented alternate settings and availability to customize settings as permitted by the ITDM may apply to adjusting, removing, altering, or otherwise updating the list of available capabilities for use by the OTB AI productivity tool in embodiments herein.

In another example embodiment, an IDTM-issued configurations policy with augmented alternate settings may configure a plurality of information handling systems to operate in a power savings mode in which various background applications or services are automatically set to draw a minimum amount of battery 208 power when the information handling system is disconnected from A/C power. However, such a configuration may slow down or deactivate a process the user is currently using or wishes to remain fully active. In order to accommodate the user's wishes to tweak or tune these policy settings, an ITDM in embodiments herein may transmit alternate settings for a given IDTM-issued configurations policy with augmented alternate settings (e.g., set the information handling system to power savings mode) that a user may choose to tailor the policy to the user's preferences, such as identifying one or more background applications or services that should be excluded from any power draw limitations that may be used in compliance with the power savings mode, to augment the policy-mandated power draw limitations.

In still another example embodiment, an IDTM-issued configurations policy with augmented alternate settings may configure a plurality of information handling systems to operate in a security mode in which the viewing angle for the display device 215_a_ is decreased to disallow viewing of the screen by others nearby the information handling system who are not authorized to view the displayed content. This may be one of several security measures included within a single configurations policy or may form its own standalone configurations policy. Some users may dislike this privacy screen setting and wish to increase the allowed viewing angle or opt out of the privacy screen setting without affecting other security settings within the ITDM-issued configurations policy. In order to accommodate the user's wishes to tweak or tune these policy settings, an ITDM in embodiments herein may transmit alternate settings for a given IDTM-issued configurations policy with augmented alternate settings (e.g., enabling privacy screen mode as part of a larger security-driven configurations policy) that a user may choose to tailor the policy to the user's preferences, such as increasing the viewing angle allowable by the privacy screen mode or removing the privacy screen setting option, to augment the policy-mandated security measures.

In yet another example embodiment, an IDTM-issued configurations policy with augmented alternate settings may configure a plurality of information handling systems to operate in a secure mode in which read or write operations to and from external devices via an external communications port 299 are limited, encrypted, or disabled. This may be one of several security measures included within a single ITDM-issued configurations policy or may form its own standalone configurations policy. Some users may wish to temporarily or permanently allow for otherwise policy-restricted read write operations via the external communications port 299, such as enabling read only or write only operations instead of disabling the external communications port 299, enabling encrypted read or write operations instead of disabling the external communications port 299 or restricting read or write operations fully, or removing all encryption, read or write limitations for a trusted device. In order to accommodate the user's wishes to tweak or tune these policy settings, an ITDM in embodiments herein may transmit alternate settings for a given IDTM-issued configurations policy with augmented alternate settings (e.g., restricting access to the information handling system via the external communications port 299) that a user may choose to tailor the policy for some of the settings to the user's preferences, such as enabling read only or write only operations instead of disabling the external communications port 299, enabling encrypted read or write operations instead of disabling the external communications port 299 or restricting read or write operations fully, or removing all encryption, read or write limitations for a trusted device.

In yet another example embodiment, an IDTM-issued configurations policy with augmented alternate settings may configure a plurality of information handling systems to operate in a secure mode in which only encrypted versions of firmware (e.g., 291_b_, 295_b_, 215_b_, 207) may be downloaded and installed on the information handling system. This may be one of several security measures included within a single ITDM-issued configurations policy or may form its own standalone configurations policy. Some users may wish to temporarily or permanently allow for downloading and installation of an unencrypted version of firmware (e.g., 291_b_, 295_b_, 215_b_, 207). In order to accommodate the user's wishes to tweak or tune these policy settings, an ITDM in embodiments herein may transmit alternate settings for a given IDTM-issued configurations policy with augmented alternate settings (e.g., requiring encryption of firmware) that a user may choose to tailor the policy for some settings to the user's preferences, such as allowing for temporary or permanent download and installation of unencrypted versions of firmware (e.g., 291_b_, 295_b_, 215_b_, 207).

As also described in an embodiment with respect to FIG. 3, the ITDM for enterprises may issue an IDTM-issued configurations policy with augmented alternate settings for a plurality of information handling systems within the enterprise to control functionality of various AI productivity tool enableable software applications 311 as well. In some cases, these policies may be adjustable or tunable by the user within parameters preset by the ITDM. For example, an IDTM-issued configurations policy with augmented alternate settings may configure a plurality of information handling systems to set a default clock speed to a defined minimum for the hardware processor 202 to conserve battery power while in a power savings mode. However, such a configuration may cause processing to slow down below user preferences. Some users may wish to increase the allowed maximum processor clock speed for the power savings mode to a level below the default or manufacturer defined maximum speed for the hardware processor 202. In order to accommodate user's wishes to tweak or tune these policy settings, if allowed, an ITDM in an embodiment may transmit alternate settings for the given configurations IDTM-issued configurations policy with augmented alternate settings that a user may choose to tailor the configurations policy to the user's preferences, such as increasing the allowed maximum processor clock speed for the power savings mode to a level below the default or manufacturer defined maximum speed for the hardware processor 202.

In another example, an IDTM-issued configurations policy with augmented alternate settings may configure a plurality of information handling systems to set a default clock speed for the hardware processor 202 to a default maximum (e.g., 80% of a manufacturer's allowable maximum) to extend the life of the hardware processor 202. However, such a configuration may cause processing to slow down below user preferences. Some users may wish to increase the allowed maximum processor clock speed for short periods of time by placing the hardware processor 202 in a turbo mode that allows the processor speed to increase above the default maximum. In order to accommodate user's wishes to tweak or tune these policy settings, if allowed, an ITDM in an embodiment may transmit alternate settings for the given IDTM-issued configurations policy with augmented alternate settings that a user may choose to tailor the configurations policy to the user's preferences, such as increasing the allowed maximum processor clock speed for the turbo mode for brief periods of time.

As another example, an IDTM-issued configurations policy with augmented alternate settings may configure a plurality of information handling systems to restrict downloading of software applications to specifically enumerated software applications. However, such a configuration may negatively impact user experience. Some users may wish to download software applications that are not on the specifically enumerated list, but are still available from trusted sources in an encrypted and secure format. In order to accommodate user's wishes to tweak or tune these policy settings, if allowed, an ITDM in an embodiment may transmit alternate settings for the given IDTM-issued configurations policy with augmented alternate settings that a user may choose to tailor the configurations policy to the user's preferences, such as by expanding the software applications available for download at the information handling system to include all applications from a trusted source, as defined by an ITDM.

In yet another example, an IDTM-issued configurations policy with augmented alternate settings may configure a plurality of information handling systems to restrict usage of hardware processing resources by one or more software applications to a first maximum processor usage value. However, such a configuration may negatively impact user experience by slowing down those software applications. Some users may wish to increase the speed of one or more of those software applications. In order to accommodate user's wishes to tweak or tune these policy settings, if allowed, an ITDM in an embodiment may transmit alternate settings for the given IDTM-issued configurations policy with augmented alternate settings that a user may choose to tailor the configurations policy to the user's preferences, such as by resetting the restriction on hardware processing resources consumed by a specifically user-identified software application to a second maximum processor usage value that exceeds the first maximum processor usage value.

In yet another example, an IDTM-issued configurations policy with augmented alternate settings may configure a plurality of information handling systems to disable push notifications from a plurality of software applications. However, such a configuration may negatively impact user experience. Some users may wish to allow push notifications from one of or a subset of the plurality of software applications for which push notifications are generally disabled. In order to accommodate user's wishes to tweak or tune these policy settings if allowed, an ITDM in an embodiment may transmit alternate settings for the given IDTM-issued configurations policy with augmented alternate settings that a user may choose to tailor the configurations policy to the user's preferences, such as by allowing the user to select one or more of the plurality of software applications for which push notifications may be enabled.

As yet another example, an IDTM-issued configurations policy with augmented alternate settings may configure a plurality of information handling systems to automatically delete all temporary files at a preset frequency (e.g., every day, every week, every month). However, such a configuration may negatively impact user experience if the user relies on those temporary files for a time period exceeding the preset frequency. Some users may wish to decrease the preset frequency in order to allow for longer periods of access, or to disable this automatic functionality altogether for certain types of files. In order to accommodate user's wishes to tweak or tune these policy settings, if allowed, an ITDM in an embodiment may transmit alternate settings for the given IDTM-issued configurations policy with augmented alternate settings that a user may choose to tailor the configurations policy to the user's preferences, such as by allowing the user to select types of files that will not be automatically deleted, or to increase the frequency with which such automatic deletion occurs.

Each of the IDTM-issued configurations policy with augmented alternate settings described directly above may be executable via one or more AI productivity tool enableable software application 311. For example, the hardware processor 302 executing machine readable code instructions for the Dell® SupportAssist® AI productivity tool enableable software application 311 may apply or institute each of those ITDM-issued configuration policy with augmented alternate settings described directly above, as well as the setting of fan speed, battery power draw restrictions, and restrictions on the download and installation of unencrypted firmware versions, as described in greater detail above with respect to FIG. 2.

Other types of AI productivity tool enableable software applications 311, such as the Dell® Display®/Peripheral Manager® software may be capable of instituting or applying other ITDM defined configuration policies and alternate settings. For example, the hardware processor 302 executing machine readable code instructions for the Dell® Display®/Peripheral Manager® software may institute or apply a configuration policy with alternate settings to place a display device in a privacy mode in which a user may choose from a limited set of available viewing angles. As another example, the hardware processor 302 executing machine readable code instructions for the Dell® Display®/Peripheral Manager® software may institute or apply a configurations policies and augmented alternate settings to place an external communication port in a secure mode in which a user may enable read only or write only operations instead of disabling the external communications port 299, enable encrypted read or write operations instead of disabling the external communications port 299, or restricting read or write operations fully, or remove all encryption, read or write limitations for a trusted device, as described in greater detail above with respect to FIG. 2.

The hardware processor in an embodiment at block 408 may execute machine readable code instructions of a mode configuration policy application module of the OTB AI productivity tool to update initial list of firmware or hardware capabilities and initial list of application capabilities to include only capabilities in compliance with most recent generalized ITDM-issued configuration policy and augmented alternate settings. For example, in embodiments herein, the mode configuration policy application module operate with a capabilities gathering module and capability intent value generator to update a registered list of software as well as firmware or hardware capabilities. The mode configuration policy application module of the OTB AI productivity tool in an embodiment may receive an ITDM-issued configuration policy with augmented alternate settings that place a battery in a power savings mode and that also identifies one or more background applications or services that should be excluded from any power draw limitations that may be used in compliance with the power savings mode. In such a scenario, the mode configuration policy application module of OTB AI productivity tool in an embodiment may remove or adjust capabilities for affecting any battery power consumption rates allowable by the manufacturer of the battery (e.g., no limitations on battery power consumption for background applications or services) that do not comply with the received ITDM-issued configuration policy with augmented alternate settings.

As another example, the mode configuration policy application module may update a list of firmware or hardware capabilities that allows for use of the full range of fan speeds achievable by the cooling device itself, as set according to the manufacturer of the cooling device. The mode configuration policy application module of the OTB AI productivity tool in an embodiment may receive an ITDM-issued configuration policy with augmented alternate settings that places the cooling device in a quiet mode in which fan speed for the cooling device is automatically lowered in order to decrease noise emission, but also allow the user to choose from a range of fan speeds for the cooling device that may be used in compliance with the quiet mode, to increase fan speed or to further decrease fan speed. In such a scenario, the mode configuration policy application module in an embodiment may remove or adjust capabilities for setting of any fan speeds allowable by the manufacturer of the cooling device, but that do not comply with the received ITDM-issued configuration policy with augmented alternate settings.

In yet another example, the mode configuration policy application module may update a list of firmware or hardware capabilities that allows for display according to the full range of viewing angles achievable by the display device, as set according to the manufacturer of the display device. The mode configuration policy application module of the OTB AI productivity tool in an embodiment may receive an ITDM-issued configuration policy with augmented alternate settings for a security mode that by default places the display device in a privacy screen mode in which the viewing angle for the display device is minimized to disallow viewing of the screen by others nearby the information handling system who are not authorized to view the displayed content, but allows for the user to increase the viewing angle to a value between the minimum value and the full range of viewing angles achievable by the display device as manufactured. In such a scenario, the mode configuration policy application module of the OTB AI productivity tool in an embodiment may alter or remove registered capabilities for any firmware or hardware capabilities setting the display device to use any viewing angles that do not comply with the received ITDM-issued configuration policy with augmented alternate settings as modified by the user.

As yet another example, the mode configuration policy application module may update a list of firmware or hardware capabilities that allows for full or unrestricted read and write operations via an external communications port, as set according to the manufacturer of the external communications port. The mode configuration policy application module of the OTB AI productivity tool in an embodiment may receive an ITDM-issued configuration policy with augmented alternate settings that by default places the external communications port in a secure mode in which read or write operations to and from external devices via an external communications port are limited, encrypted, or disabled, but allows for the user to temporarily or permanently enable read only or write only operations instead of disabling the external communications port, enable encrypted read or write operations instead of disabling the external communications port or restrict read or write operations fully, or remove all encryption, read or write limitations for a trusted device. In such a scenario, the mode configuration policy application module of the OTB AI productivity tool in an embodiment may alter or remove any registered external communication port capabilities that do not comply with the received ITDM-issued configuration policy with augmented alternate settings and user adjustments.

In still another example, the mode configuration policy application module may update a list of firmware or hardware capabilities that allows for download and installation of unencrypted firmware. The mode configuration policy application module of the OTB AI productivity tool in an embodiment may receive an ITDM-issued configuration policy with augmented alternate settings that by default places the information handling system in a secure mode in which only encrypted versions of firmware may be downloaded and installed on the information handling system, but allows for the user to temporarily or permanently enable download and installation of a specifically identified version of firmware. In such a scenario, the mode configuration policy application module of the OTB AI productivity tool in an embodiment may alter or remove any registered firmware or hardware capabilities that do not comply with the received ITDM-issued configuration policy with augmented alternate settings.

In another example, the hardware processor executing machine readable code instructions of the mode configuration policy application module for the OTB AI productivity tool may register an updated list of application capabilities for the Dell® SupportAssist® AI productivity tool enableable software application to alter or remove initially registered application capabilities that are not in compliance with a most recently received generalized ITDM-issued configuration policy with augmented alternate settings to restrict a processor clock speed for a power savings mode to a user-specified level below the default or manufacturer defined maximum speed for the hardware processor 202. In another example, the hardware processor executing machine readable code instructions of the mode configuration policy application module for the OTB AI productivity tool may register an updated list of application capabilities for the Dell® SupportAssist® AI productivity tool enableable software application to alter or remove initially registered application capabilities that are not in compliance with a most recently received generalized ITDM-issued configuration policy with augmented alternate settings to allow the user to increase an allowed maximum processor clock speed for a short duration of time while the information handling system is placed in turbo mode. As another example, the hardware processor executing machine readable code instructions of the mode configuration policy application module for the OTB AI productivity tool may register an updated list of application capabilities for the Dell® SupportAssist® AI productivity tool enableable software application to alter or remove initially registered application capabilities that are not in compliance with a most recently received generalized ITDM-issued configuration policy with augmented alternate settings to expand a list of software applications available for download at the information handling system from a pre-defined and enumerated list to include all applications from a trusted source, as defined by an ITDM. In yet another example, the hardware processor executing machine readable code instructions of the mode configuration policy application module for the OTB AI productivity tool may register an updated list of application capabilities for the Dell® SupportAssist® AI productivity tool enableable software application to alter or remove initially registered application capabilities that are not in compliance with a most recently received generalized ITDM-issued configuration policy with augmented alternate settings to reset a restriction on hardware processing resources consumed by a specifically user-identified software application to a second maximum processor usage value that exceeds the first maximum processor usage value applied to other software applications not identified by the user.

As still another example, the hardware processor executing machine readable code instructions of the mode configuration policy application module for the OTB AI productivity tool may register an updated list of application capabilities for the Dell® SupportAssist® AI productivity tool enableable software application to alter or remove initially registered application capabilities that are not in compliance with a most recently received generalized ITDM-issued configuration policy with augmented alternate settings to allow the user to select one or more of a plurality of software applications for that may be excluded from a configuration policy that generally disables push notifications. In yet another example, the hardware processor executing machine readable code instructions of the mode configuration policy application module for the OTB AI productivity tool may register an updated list of application capabilities for the Dell® SupportAssist® AI productivity tool enableable software application to alter or remove initially registered application capabilities that are not in compliance with a most recently received generalized ITDM-issued configuration policy with augmented alternate settings to allow the user to select types of files that will not be automatically deleted as per a general configuration policy to automatically delete all temporary files at a preset frequency, or to increase the frequency with which such automatic deletion occurs. In still another example, the hardware processor executing machine readable code instructions of the mode configuration policy application module for the OTB AI productivity tool may register an updated list of application capabilities for the Dell® SupportAssist® AI productivity tool enableable software application to alter or remove initially registered application capabilities that are not in compliance with a most recently received generalized ITDM-issued configuration policy with augmented alternate settings to set fan speed, battery power draw restrictions, and restrictions on the download and installation of unencrypted firmware versions.

The hardware processor executing machine readable code instructions of the mode configuration policy application module for the OTB AI productivity tool may register an updated list of application capabilities for the Dell® Display®/Peripheral Manager® software AI productivity tool enableable software application to alter or remove other initially registered application capabilities that are not in compliance with a most recently received generalized ITDM-issued configuration policy with augmented alternate settings, such as setting a display device to display outside of a user-defined viewing angle allowed by an ITDM that has placed the display device in privacy mode. In another example, the hardware processor executing machine readable code instructions of the mode configuration policy application module for the OTB AI productivity tool may register an updated list of application capabilities for the Dell® Display®/Peripheral Manager® software AI productivity tool enableable software application to alter or remove other initially registered application capabilities that are not in compliance with a most recently received generalized ITDM-issued configuration policy with augmented alternate settings, such as capabilities that allow for completely unrestricted read and write operations via an external communication port, unencrypted read and write operations, or unrestricted read and write operations with devices not defined as trusted devices, for example. In this way, the hardware processor executing machine readable code instructions of the mode configuration policy application module for the OTB AI productivity tool may ensure that any commands to execute functionality of the registered AI productivity tool enableable software application capabilities, or firmware or hardware capabilities are in accordance with most recent generalized ITDM-issued configuration policies with augmented alternate settings for those configuration policies, as allowed by an ITDM in embodiments herein.

At block 410, in an embodiment, the hardware processor may execute machine readable code instructions of a capability intent value generator for the OTB AI productivity tool to generate vectorized capability intent values for the natural language descriptions of application, firmware or hardware capabilities in the updated list of registered application, firmware or hardware capabilities. For example, in an embodiment, each of the application, firmware or hardware capabilities stored at the capability intent values database, may have a description with text descriptors, may be associated with a unique ID, and may have a capability intent value generated based on those text descriptors in an embodiment. Upon registration or updating of a given application, firmware or hardware capability in an embodiment, a hardware processor for the information handling system may execute machine readable code instructions of a capability intent value generator module utilizing one or more text embedding algorithms of a text embedding module to generate a multi-axis vector capability intent value for that capability, including updated application, firmware or hardware capabilities, that is based on text descriptors for that capability. Each axis of the multi-axis vector space may provide a measurement of various attributes of a text excerpt that are known to provide context or semantic understanding of the text. Further, each of these updated application, firmware or hardware capability intent values generated by the text embedding module for association with these initial or recently updated application, firmware or hardware capabilities may also be associated with a capability identification value or capability ID such as an alphanumeric ID that may identify, uniquely, each of these application, firmware or hardware capabilities in the capability intent values database, for example.

Each axis of the multi-axis vector space, and thus, each value within a vector within such a multi-axis vector space may provide a measurement of these various attributes within a given initial or updated capability intent value in embodiments herein. For example, a vector for a user query input intent value or for capability intent value may provide a measurement of similarity between any given word within the user query input or registered capabilities, respectively. In other embodiments, some other axis values may provide a measurement of dissimilarity with known antonyms, identification of any given word as part of a phrase, or usage of any given word in a specific order that is known to be of importance. In such a way, the vectorized user query input intent value and capability intent values may mathematically represent a reader's contextual or semantic understanding of the capability natural language text descriptors as well as for a user query input to allow for semantic as well as lexical comparison in some embodiments as described below.

The hardware processor at block 412 in an embodiment executing machine readable code instructions for the universal user conversational interface software application may receive, via an input device, a user query input requesting action by the information handling system. For example, in embodiments described herein, a user may provide text or voice data (e.g., via any IO device such as a microphone) to a universal user conversational interface software application operating as a chatbot to simulate a conversation between the user and the OTB AI productivity tool.

At block 414 in an embodiment, the hardware processor may execute machine readable code instructions at the operating system level of an OTB AI productivity tool text embedding module to generate a vector query intent value for the received user query input. For example, in an embodiment, a hardware processor may execute machine-readable code instructions of the query intent determination module for the OTB AI productivity tool to receive the user query input via microphone, image, or text input, and initiate execution of machine readable code instructions for an intent recognition pipeline machine learning module.

The hardware processor in an embodiment at block 416 may execute machine readable code instructions of an OTB AI productivity tool semantic similarity search module to perform a semantic or lexical similarity search algorithm comparing the vector query intent value against each of the plurality of capability intent values, including application, firmware or hardware capability intent values associated with firmware or hardware components and managed through execution of AI productivity tool-enableable platform service tool. For example, a hardware processor may execute machine readable code instructions for a semantic similarity search module, via a query intent to capability determination module, that compares the vectorized user query input intent value and the capability intent values stored within the capability intent values database. This may include updated application, firmware or hardware capability intent values as described above. Such a comparison may be performed using a semantic search machine learning model, such as a cosine or other semantic similarity search algorithm, that compares the distance or value difference or angular differences in a multi-axis vector space between two vectors to determine the contextual similarity between the application, firmware or hardware capability intent values and the user query input intent value generated from an embedded user query. Such a contextual or semantic search methodology may take into account the fact that the same word may have two meanings or consider synonyms of words, for example based on generated intent values of multiple words or recognized phrases or parts of speech that yield the vector intent value from the text embedding algorithm machine learning models used to generate capability intent values and query intent vector value. The cosine similarity search comparison or other semantic similarity search algorithm may be performed for several of the capability intent values stored within the capability intent value database to identify a best match that is a highest or threshold-level cosine semantic search score for either initial or updated capability intent value that sufficiently or most closely matches the user query input value, according to embodiments herein.

At block 418 in an embodiment, the hardware processor may execute machine readable code instructions of an OTB AI productivity tool query intent to capability determination module to identify the one or more application, firmware or hardware capability for a hardware component, or the AI productivity tool-enableable software capability having a highest similarity search score or a similarity search score meeting a threshold similarity search score level as the best match capability for the received user query input. For example, the hardware processor in an embodiment may execute machine readable code instructions of an OTB AI productivity tool query intent to capability determination module to identify the available firmware or software capability having a highest semantic similarity search score that meets a minimum threshold value (e.g., 0.5, 0.7, 0.9) as the best match capability for the received user query input in an embodiment. These updated application, firmware or hardware capabilities will reflect the current version of firmware or hardware configuration at the platform level in embodiments herein.

At block 420, in an embodiment in which a best match capability meeting a threshold semantic similarity value has been identified, the hardware processor may execute machine readable code instructions of an OTB AI productivity tool to direct execution of one or more processes that are associated with a best match application, firmware or hardware capability at firmware for hardware devices at the platform level via the single communication link with the embedded controller executing the AI productivity tool-enableable platform service tool. For example, in embodiments, upon identification of a responsive application, firmware or hardware capability that addresses the determined user query input, the hardware processor executing machine-readable code instructions of the OTB AI productivity tool may direct execution of one or more firmware processes via the AI productivity tool-enableable platform service tool to direct one or more versions of firmware to execute adjustment or operation of associated one or more hardware components. In such a way, the OTB AI productivity tool may implement a number of actions or utilizes services via the AI productivity tool-enableable platform service tool at the platform level to execute responsive application, firmware or hardware capabilities of one or more versions of firmware for control of one or more hardware components to respond to a received user query input. This execution of a responsive, updated application, firmware or hardware capability or capabilities in embodiments herein will be in accordance with currently supported by ITDM-issued configuration policy with augmentable alternate settings as customized by a user for the one or AI productivity tool-enableable software applications, firmware, or one or more hardware components.

Proceeding to block 422, the hardware processor may determine if the information handling system has been powered down. If so, the method may then end. If the information handling system has not been powered down, the method may proceed to block 424.

At block 424, the hardware processor executing the universal user conversational interface software application of the OTB AI productivity tool monitors to determine if another user query input has been received. Additionally, the hardware processor executing machine readable code instructions of the mode configuration policy application module for the OTB AI productivity tool monitors for receipt of another ITDM-issued configuration policy with augmentable alternate settings from an ITDM. If at block 424, another user query input has been received, the method returns to block 412 and proceeds from there. If at block 424, the OTB AI productivity tool detects receipt of another ITDM-issued configuration policy with augmentable alternate settings from an ITDM, the method returns to block 406 and proceeds. If at block 424, neither is detected, the method returns to block 422 to determine if the information handling system will power down.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system operating an on-the-box (OTB) artificial intelligence (AI) productivity tool comprising:

a hardware processor executing machine readable code instructions of the OTB AI productivity tool to set an initial list of capabilities with vectorized capability intent values in a capabilities database for a plurality of AI productivity tool enableable software applications executing at an information handling system;

a network interface device for receiving, from a management server, a general information technology decision maker (ITDM)-issued configuration policy dictating one or more controlled operational modes of one of the plurality of AI productivity tool enableable software applications, and identification of an alternate setting for a controlled operational mode permitted for user selection for tuning of the general ITDM-issued configuration policy;

the hardware processor executing machine readable code instructions of a mode configuration policy application module of the OTB AI productivity tool to generate an updated list of capabilities with updated vectorized capability intent values by adjusting the capabilities in the capabilities database to comply with the general ITDM-issued configuration policy and the alternate settings selected by a user and apply limitations or adjustments of the controlled operation mode to the capabilities;

the hardware processor executing machine readable code instructions to receive a user query input via a universal user conversational interface software application a system action of the AI productivity tool enableable software application and generate a vectorized query input intent value for semantic matching to select a responsive updated vectorized capability intent value as responsive to the user query input; and the hardware processor executing machine readable code instructions to instruct the AI productivity tool enableable software application to perform an updated capability of the responsive updated vectorized capability intent value in the controlled operational mode.

2. The information handling system of claim 1, wherein the mode configuration policy application module adjusts a first capability in the updated list of capabilities to omit a feature of the AI productivity tool enableable software application within the initial list of capabilities that has been disabled in the general ITDM-issued configuration policy and the alternate setting.

3. The information handling system of claim 1, wherein the general ITDM-issued configuration policy for a secure mode restricts downloading of software applications to restricted software applications specifically enumerated by the ITDM and the alternate setting is selected by the user to include allowing downloading of selected software applications from a trusted device that are not within the specifically enumerated restricted software applications.

4. The information handling system of claim 1, wherein the general ITDM-issued configuration policy for a power savings mode restricts usage of the hardware processor by the AI productivity tool enableable software application to a first maximum processor usage value and the alternate setting selected by the user allows usage of the hardware processor by the AI productivity tool enableable software application to a second maximum processor usage value that exceeds the first maximum processor usage value.

5. The information handling system of claim 1, wherein the general ITDM-issued configuration policy sets a memory device to automatically delete temporary files and the alternate setting selected by the user disables automatic deletion of temporary files.

6. The information handling system of claim 1 further comprising:

the hardware processor executing machine readable code instructions of the mode configuration policy application module of the OTB AI productivity tool to receive the ITDM-issued configuration policy and the alternate settings and execute an embedding algorithm on alterations to a first capability to generate a first updated capability intent value for the first capability to reflect execution of that first capability in accordance with the ITDM-issued configuration policy and any alternate setting selected by the user.

7. The information handling system of claim 1 further comprising:

the hardware processor executing machine readable code instructions of the OTB AI productivity tool and the universal user conversational interface software application to notify the user that the requested action cannot be performed if the query input intent value for the user query input does not semantically match to any updated capability intent value within the updated list of capabilities pursuant to the general ITDM-issued configuration policy and the alternate setting selected by the user.

8. A method of executing machine readable code instructions for an on the box (OTB) artificial intelligence (AI) productivity tool to assist a user to tune software, firmware or hardware configurations in compliance with a general ITDM-issued configuration policy comprising:

receiving an initial list of software, firmware, and hardware capabilities with vectorized capability intent values at a capabilities database, via a hardware processor executing machine readable code instructions of the OTB AI productivity tool;

receiving, via a network interface device, from a management server a general information technology decision maker (ITDM)-issued configuration policy dictating one or more controlled operational modes of the information handling system and including identification of an alternate setting for a first controlled operational mode permitted for user selection for tuning of the general ITDM-issued configuration policy;

generating, via the hardware processor executing machine readable code instructions of a mode configuration policy application module of the OTB AI productivity tool, an updated list of software, firmware or hardware capabilities with updated vectorized capability values by adjusting the software, firmware or hardware capabilities in the capabilities database affected by the general ITDM-issued configuration policy and any alternate settings selected by a user to apply limitations or adjustments of the controlled operational mode and the alternate setting;

executing machine readable code instructions, via the hardware processor, of the OTB AI productivity tool to receive a user query input and generate a vectorized query intent value and semantically or lexically match the vectorized query intent value to a responsive, updated vectorized capability intent value as a best similarity match similarity score from the capability database responsive to the user query input; and instructing, via the hardware processor executing machine readable code instructions, the software, firmware or hardware component to perform the best match updated capability associated with the responsive, updated vectorized capability intent value.

9. The method of claim 8, wherein an alternate setting is selected by the user via second user query input to the OTB AI productivity tool to modify the ITDM-issued configuration policy for the updated list of software, firmware or hardware capabilities within the capability database.

10. The method of claim 8 further comprising:

receiving the ITDM-issued configuration policy and any selected alternate settings from a user; and executing an embedding algorithm, via the hardware processor, on alterations to a first capability pursuant to the ITDM-issued configuration policy and any selected alternate settings to generate a first updated capability intent value for the first capability in the capability database to reflect execution of that first capability in accordance with the ITDM-issued configuration policy and any selected alternate setting selected by the user.

11. The method of claim 8, wherein the general ITDM-issued configuration policy for a quiet mode dictates a first range of speeds for a cooling device and the alternate setting selected by the user includes a second range of speeds for the cooling device that is different than the first range of speeds.

12. The method of claim 8, wherein the general ITDM-issued configuration policy for a security mode dictates use of a privacy screen setting for minimizing an allowed viewing angle for a display device and the alternate setting selected by the user includes increasing the allowed viewing angle above a minimum value.

13. An information handling system operating an on-the-box (OTB) artificial intelligence (AI) productivity tool comprising:

a hardware processor executing machine readable code instructions of the OTB AI productivity tool to set an initial list of capabilities with vectorized capability intent values in a capabilities database for software, firmware, or hardware for a plurality of AI productivity tool enableable software applications executing at an information handling system and for platform-level firmware or hardware;

a network interface device for receiving, from a management server, a general information technology decision maker (ITDM)-issued configuration policy dictating one or more controlled operational modes at the information handling system affecting execution of the capabilities with the OTB AI productivity tool;

the hardware processor executing machine readable code instructions of a mode configuration policy application module of the OTB AI productivity tool to generate an updated list of capabilities with updated vectorized capability intent values by adjusting the capabilities in the capabilities database to comply with the general ITDM-issued configuration policy for a first controlled operational mode and apply limitations or adjustments of the first controlled operation mode to the capabilities;

the hardware processor executing machine readable code instructions to receive a user query input via a universal user conversational interface software application requesting a system action of the AI productivity tool enableable software application and to generate a vectorized query input intent value for semantic matching to select a responsive updated vectorized capability intent value as responsive to the user query input; and the hardware processor executing machine readable code instructions to execute an updated capability of the responsive updated vectorized capability intent value for the software, the firmware, or the hardware in the first controlled operational mode at the information handling system.

14. The information handling system of claim 13, wherein the mode configuration policy application module adjusts a first capability in the updated list of capabilities to omit a feature of the AI productivity tool enableable software application, the firmware, or the hardware within the initial list of capabilities that has been disabled in the general ITDM-issued configuration policy.

15. The information handling system of claim 13 further comprising:

the hardware processor executing machine readable code instructions of the mode configuration policy application module of the OTB AI productivity tool to receive the ITDM-issued configuration policy and execute an embedding algorithm on alterations to any capabilities in the initial list of capabilities to generate the updated capability intent values to reflect execution of those altered capabilities in accordance with the ITDM-issued configuration policy for the first controlled operational mode.

16. The information handling system of claim 13, wherein the general ITDM-issued configuration policy further includes identification of an alternate setting for the first controlled operational mode permitted within the general ITDM-issued configuration policy and available for user selection for tuning of the general ITDM-issued configuration policy.

17. The information handling system of claim 13 further comprising:

the hardware processor executing machine readable code instructions of the mode configuration policy application module of the OTB AI productivity tool to receive selection by a user of an alternate setting for the first controlled operational mode permitted within the general ITDM-issued configuration policy to tune the general ITDM-issued configuration policy; and the hardware processor executing machine readable code instructions of the mode configuration policy application module to generate the updated list of capabilities with the updated vectorized capability intent values by adjusting the capabilities in the capabilities database to comply with the general ITDM-issued configuration policy and the alternate settings selected by the user.

18. The information handling system of claim 13 further comprising:

the hardware processor executing machine readable code instructions of the OTB AI productivity tool and the universal user conversational interface software application receive user query inputs requesting adjustment to a setting that is adjusted under the ITDM-issued configuration policy for a first capability and determine the adjustments to the setting for the first capability are permitted as an alternate setting; and the hardware processor to amend the ITDM-issued configuration policy with the alternate setting and generate a first updated capability registered in the capabilities database to comply with the general ITDM-issued configuration policy and the alternate setting selected by the user.

19. The information handling system of claim 13, wherein the general ITDM-issued configuration policy for a secure policy disables use of an external port.

20. The information handling system of claim 13, wherein the general ITDM-issued configuration policy dictates a default clock speed for the hardware processor and an alternate setting permitted by the ITDM-issued configuration policy is selected by the user adjust clock speed for the hardware processor from the default clock speed.

* * * * *